(12) United States Patent
Haga et al.

(10) Patent No.: US 9,258,283 B2
(45) Date of Patent: Feb. 9, 2016

(54) KEY MANAGEMENT SYSTEM, KEY MANAGEMENT METHOD, AND COMMUNICATION DEVICE

(71) Applicant: Panasonic Corporation, Osaka (JP)

(72) Inventors: Tomoyuki Haga, Nara (JP); Natsume Matsuzaki, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 349 days.

(21) Appl. No.: 14/002,126

(22) PCT Filed: Dec. 27, 2012

(86) PCT No.: PCT/JP2012/008397
§ 371 (c)(1),
(2) Date: Aug. 29, 2013

(87) PCT Pub. No.: WO2013/111251
PCT Pub. Date: Aug. 1, 2013

(65) Prior Publication Data
US 2014/0059352 A1 Feb. 27, 2014

(30) Foreign Application Priority Data

Jan. 25, 2012 (JP) ................................. 2012-013413

(51) Int. Cl.
*H04L 9/08* (2006.01)
*H04L 29/06* (2006.01)
*G05B 15/02* (2006.01)

(52) U.S. Cl.
CPC .............. *H04L 63/061* (2013.01); *G05B 15/02* (2013.01); *H04L 9/0822* (2013.01); *G05B 2219/2614* (2013.01); *H04L 2209/805* (2013.01)

(58) Field of Classification Search
USPC .......... 713/171, 175; 705/2, 50; 380/277, 278
See application file for complete search history.

(56) References Cited

U.S. PATENT DOCUMENTS 6,058,477 A * 5/2000 Kusakabe ............ G06Q 20/341
380/283
RE39,622 E 5/2007 Kusakabe et al.
(Continued)

FOREIGN PATENT DOCUMENTS

EP 1 993 301 11/2008
JP 10-200522 7/1998
(Continued)

OTHER PUBLICATIONS

International Search Report issued Mar. 5, 2013 in International (PCT) Application No. PCT/JP2012/008397.
(Continued)

*Primary Examiner* — Joseph P Hirl
*Assistant Examiner* — Sayed Beheshti Shirazi
(74) *Attorney, Agent, or Firm* — Wenderoth, Lind & Ponack, L.L.P.

(57) ABSTRACT

In a key management system, a RFID tag decrypts a first key encrypted by a master key and stores the decrypted first key to a service key storage region, then decrypts a second key encrypted by the first key in a third party server, then, encrypts the decrypted second key by the master key and transmits the second key encrypted by the master key to an application of a mobile information terminal, and then decrypts the encrypted second key returned from the application and stores the decrypted second key to the service key storage region.

13 Claims, 15 Drawing Sheets

(56) References Cited

U.S. PATENT DOCUMENTS

| | | | | |
|---|---|---|---|---|
| 2005/0013440 | A1* | 1/2005 | Akiyama | H04H 60/16 380/277 |
| 2006/0010007 | A1* | 1/2006 | Denman | G06F 19/321 705/2 |
| 2007/0106898 | A1* | 5/2007 | Mizutani | H04L 63/0823 713/171 |
| 2008/0004798 | A1* | 1/2008 | Troxler | A01K 15/023 702/187 |
| 2008/0172334 | A1* | 7/2008 | Jung | H04L 12/18 705/50 |
| 2011/0007901 | A1 | 1/2011 | Ikeda et al. | |
| 2011/0312278 | A1 | 12/2011 | Matsushita et al. | |
| 2012/0019674 | A1* | 1/2012 | Ohnishi | G08C 17/00 348/207.1 |
| 2012/0164944 | A1* | 6/2012 | Yamaoka | G06K 7/10198 455/41.1 |
| 2013/0038634 | A1* | 2/2013 | Yamada | G09G 5/00 345/649 |

FOREIGN PATENT DOCUMENTS

| | | |
|---|---|---|
| JP | 2008-312200 | 12/2008 |
| JP | 4368274 | 11/2009 |
| WO | 2006/039616 | 4/2006 |
| WO | 2010/073732 | 7/2010 |
| WO | 2012/004939 | 1/2012 |

OTHER PUBLICATIONS

Nikkei Electronics Mar. 21, 2011, pp. 56-63 with partial English translation.

* cited by examiner

| User ID | Device ID | Home Appliance Information |
|---|---|---|
| User A | 10001 | Microwave History Information 1 |
| User A | 10001 | Microwave History Information 2 |
| User A | 20001 | Refrigerator History Information 1 |
| User A | 20001 | Refrigerator History Information 2 |
| User A | 30001 | Rice Cooker History Information 1 |
| User B | 10002 | Microwave History Information 1 |
| User B | 10002 | Microwave History Information 2 |
| User B | 20002 | Refrigerator History Information 1 |
| User B | 20002 | Refrigerator History Information 2 |
| User B | 30002 | Rice Cooker History Information 1 |

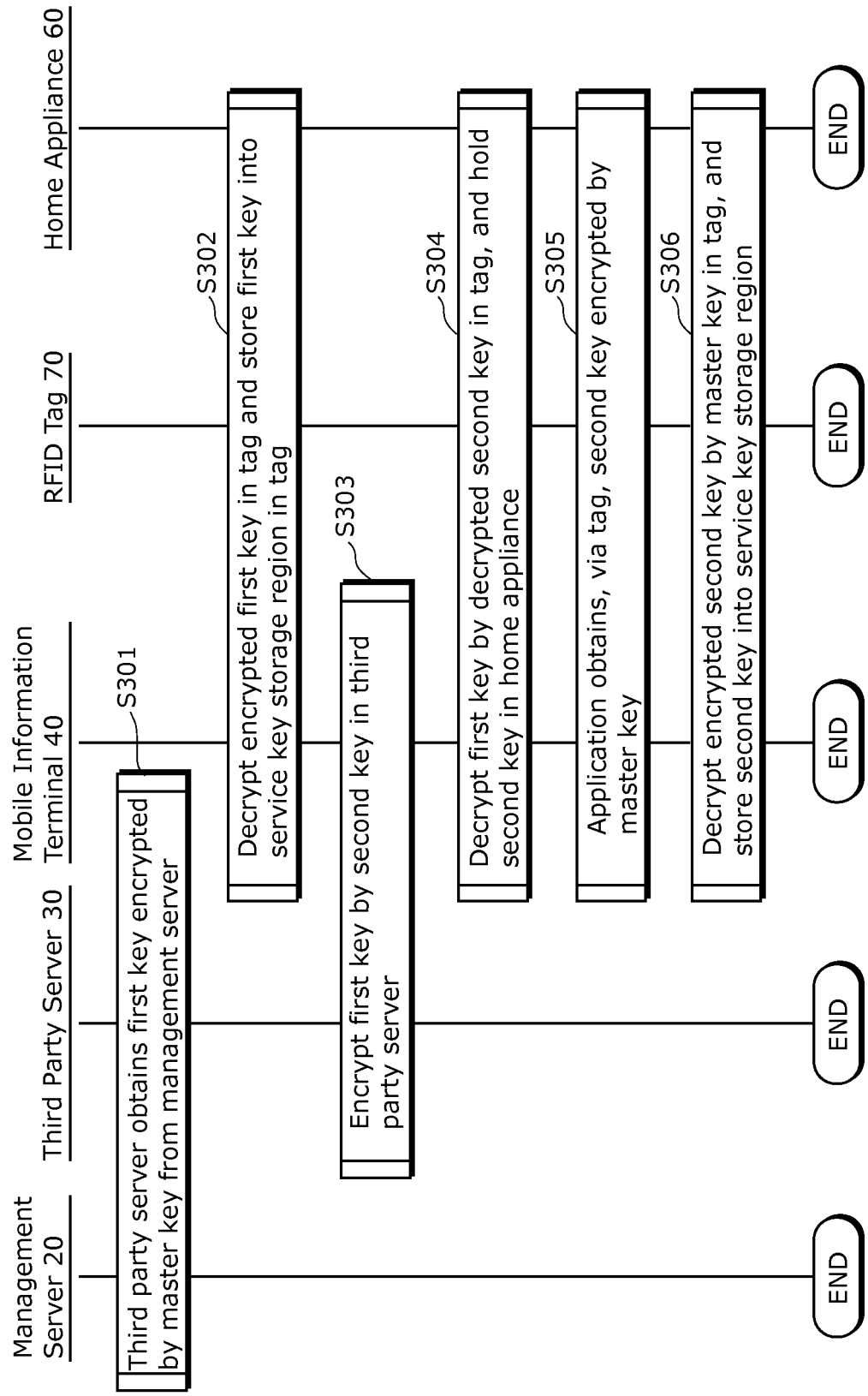

KEY MANAGEMENT SYSTEM, KEY MANAGEMENT METHOD, AND COMMUNICATION DEVICE

TECHNICAL FIELD

The present invention relates to key management systems, key management methods, and the like which securely update a key in a home appliance by using communication between a mobile information terminal and the home appliance.

BACKGROUND ART

In recent years, so-called smartphones, which are multi-functional mobile telephones having functions of personal computers as a basis, have spread rapidly. It has therefore become possible to offer services using cooperation between such a smartphone and home appliances.

For example, communication between a smartphone and home appliances allows the smartphone to read pieces of information regarding the various home appliances (hereinafter, referred to simply as pieces of "home appliance information") which are accumulated and held in the respective home appliances.

It is also able to consider services of transmitting the pieces of home appliance information read from the home appliances to a server in a Cloud system via a communication function of the smartphone and then accumulated in the server, not in the smartphone. As a result, based on the pieces of home appliance information accumulated in the server, various kinds of services suitable for a user can be provided.

Application programs installed in smartphones (hereinafter, referred to simply as "applications") are allowed to be freely distributed. Therefore, smartphones have various security problems such as occurrence of malwares created by falsifying authorized applications.

If a piece of home appliance information as described above is, in particular, privacy information such as an operation history or power consumption information of a home appliance, it is therefore necessary to encrypt the home appliance information before transmitting it to prevent the privacy information from being leaked.

For example, if a piece of home appliance information is transmitted to a server via a smartphone, there is a risk that malware installed in the smartphone makes a main-in-the-middle attack. In order to avoid this, end-to-end cryptographic communication between the home appliance and the serer is necessary.

Here, a key necessary in the end-to-end cryptographic communication is previously stored in both the server and the home appliance to be shared between them. In general, it is necessary to update the key to ensure security.

The above key updating is performed by a manager (management server) that manages a service platform. The details of the key updating are as follows.

First, a master key which only a manager knows is previously stored in both a management server and a home appliance. Here, the management server transmits, to the home appliance, a key encrypted by the master key.

Then, the home appliance receives the encrypted key and decrypts it by using the master key previously stored in the home appliance. The decrypted key is written in a predetermined storage region in the home appliance.

That is the key updating.

Here, there is a case where a service company (hereinafter, referred to as a "third party") that is not the manager offers services using the service platform managed by the manager.

In this case, in order to update a key (third party key) to be used between a server of the third party and the home appliance, it is necessary to encrypt the key by the master key and transmit it to the home appliance. In other words, when updating the third party key, the server of the third party needs to provide the third party key to the management server and ask the management server to encrypt the third party key by the master key.

CITATION LIST

Patent Literatures

[PTL 1] Japanese Unexamined Patent Application Publication No. 10-200522
[PTL 2] Japanese Patent Publication No. 4368274

Non Patent Literature

[NPL 1] Nikkei Electronics, Mar. 21, 2011, (pp. 56-63)

SUMMARY OF INVENTION

Technical Problem

Here, for security reasons, the third party should not publish the third party key to the management server. In other words, there is a problem that the third party cannot update the third party key without publishing the third party key to the management server.

An object of the present invention is to provide a key management system and the like capable of writing a third party key for security into a home appliance without publishing the third party key to a management server.

Solution to Problem

In order to solve the above problem, in accordance with an aspect of the present invention, there is provided a key management system for writing, into a home appliance, a second key to be used in cryptographic communication between the home appliance and a second server, by using a mobile information terminal that communicates with (a) a first server managing a master key and (b) the second server managing a first key and the second key, the key management system including: the mobile information terminal; and the home appliance, wherein the home appliance includes: a communication unit configured to communicate with the mobile information terminal; a master key storage region in which the master key is previously stored; a service key storage region in which the first key and the second key are to be stored; a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, when the mobile information terminal receives, from one of the first server and the second server, the first key encrypted by the master key managed in the first server, the mobile information terminal transmits (a) the first key encrypted by the master key and (b) a request for writing of the first key, when the communication unit receives the first key encrypted by the master key and the request for writing of the first key from the mobile information terminal, the cryptographic processing unit is configured to decrypt the first key by the master key stored in the master key storage region, and the key writing processing unit is configured to write the decrypted first key to the service key storage region, when the mobile information terminal receives, from the second server, the second key encrypted by the first key managed in the second server, the mobile information terminal transmits, to the communication unit, the second key encrypted by the first key, when the communication unit receives, from the mobile information terminal, the second key encrypted by the first key, the cryptographic processing unit is configured to decrypt the second key by the first key stored in the service key storage region, the home appliance holds the decrypted second key, the mobile information terminal transmits, to the communication unit, a request for reading of the second key held in the home appliance, when the communication unit receives, from the mobile information terminal, the request for reading of the second key, the cryptographic processing unit is configured to encrypt, by the master key stored in the master key storage region, the second key held in the home appliance, and the second key encrypted by the master key is transmitted to the mobile information terminal, the mobile information terminal receives, from the communication unit, the second key encrypted by the master key, and transmits, to the communication unit, the second key and a request for writing of the second key, and when the communication unit receives, from the mobile information terminal, the second key encrypted by the master key and the request for writing of the second key, the cryptographic processing unit is configured to decrypt the second key by the master key stored in the master key storage region, and the key writing processing unit is configured to write the decrypted second key to the service key storage region.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The present invention is capable of securely writing a third party key into a home appliance without publishing the third party key to a management server that manages a service platform.

BRIEF DESCRIPTION OF DRAWINGS

FIG. 8 is a table of a home appliance information management database managed by the management server according to Embodiment 1.

FIG. 9 is a schematic diagram of a third party key writing sequence according to Embodiment 1.

Figure 1:
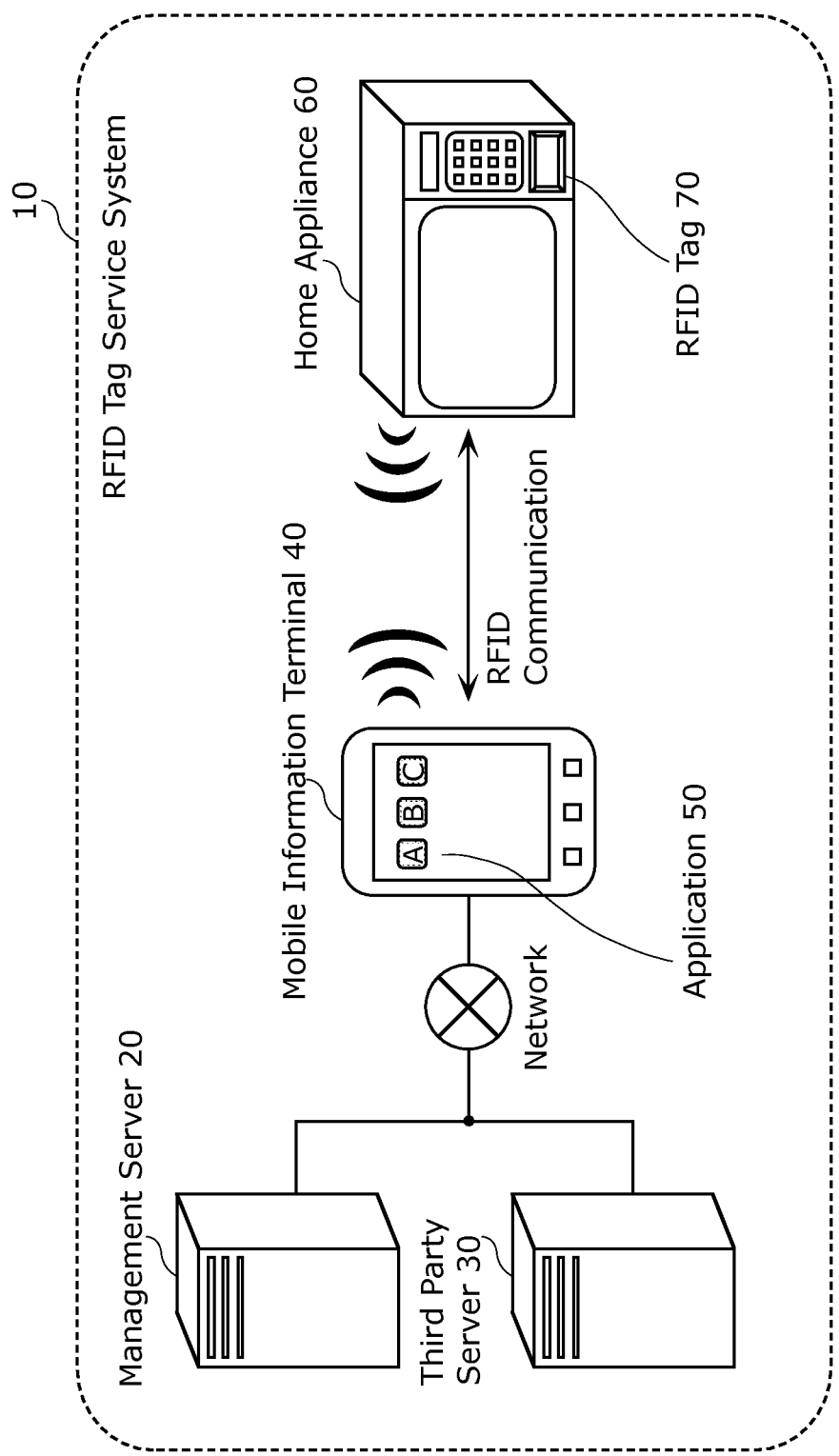
FIG. 1 is a configuration diagram of an RFID tag service system according to Embodiment 1.

DESCRIPTION OF EMBODIMENTS (Observation based on which Present invention is Conceived)

As described in "Background Art", it has become possible to offer services using cooperation between a smartphone and a home appliance. Here, it is able to consider the case where a smartphone and a target home appliance communicate with each other by using near field communication technologies.

Among the near field communication technologies, as Radio Frequency Identification (RFID) standards using a frequency having a frequency band of 13.56 MHz, there are ISO 14443 Type A, ISO 14443 Type B, and ISO 15693. There is also a Near Field Communication (NFC) standard as an international standard defied to deal with these RFID standards together.

As smartphones adopt the above-described NFC, a possibility of introducing the NFC in devices (for example, wellness devices, white goods, and the like) other than smartphones is increased (see Non-Patent Literature 1).

If an NFC tag is embedded in a home appliance, service utilizing cooperation between a smartphone and the home appliance is possible. For example, it is able to consider services of transmitting home appliance information to a server in a Cloud system via a communication function of the smartphone.

Here, as described above, communication via a smartphone has various security problems, so that end-to-end cryptographic communication between an NFC tag and a server is necessary. In addition, it is generally necessary to update a key of the cryptographic communication to ensure security.

As an example of the technologies of updating a key, Non-Patent Literature 1 discloses a method of updating a key of an IC card. In Non-Patent Literature 1, a key encrypted by a management key associated with an IC card is transmitted to the IC card. In the IC card, the transmitted key is decrypted by using the management key. Then, the decrypted key is written in a predetermined position.

Moreover, Patent Literature 2 discloses a technique different from that of Patent Literature 1. In Patent Literature 2, an update key is encrypted by the same key as that in an IC card. The encrypted update key is provided to the IC card. The encrypted update key is decrypted in the IC card. Here, it is determined whether or not the resulting is the same as the predetermined conditions. If the resulting is the same as predetermined conditions, then the decrypted update key is stored in a predetermined storage region.

In Patent Literatures 1 and 2, a key encrypted by a master key embedded in an IC card is provided to the IC card, and then decrypted and updated (rewritten) in the IC card. In other words, only when the IC card receives a key encrypted by the master key, the key is written in the IC card. The above technique is used in updating a key to be stored in an NFC tag, thereby updating the key.

However, a master key previously stored in the NFC tag is a key held in a management server that manages a service platform using the NFC tag. When a third party provides its services using the above service platform, in order to update a third party key, it is necessary that a server of the third party provides the third party key to the management server and requests the management server to encrypt the third party key by using the master key.

More specifically, there is a problem that the third party cannot update the third party key without publishing the third party key to the management server.

In order to solve the above-described conventional problem, in accordance with an aspect of the present invention, there is provided a key management system for writing, into a home appliance, a second key to be used in cryptographic communication between the home appliance and a second server, by using a mobile information terminal that communicates with (a) a first server managing a master key and (b) the second server managing a first key and the second key, the key management system including: the mobile information terminal; and the home appliance, wherein the home appliance includes: a communication unit configured to communicate with the mobile information terminal; a master key storage region in which the master key is previously stored; a service key storage region in which the first key and the second key are to be stored; a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, when the mobile information terminal receives, from one of the first server and the second server, the first key encrypted by the master key managed in the first server, the mobile information terminal transmits (a) the first key encrypted by the master key and (b) a request for writing of the first key, when the communication unit receives the first key encrypted by the master key and the request for writing of the first key from the mobile information terminal, the cryptographic processing unit is configured to decrypt the first key by the master key stored in the master key storage region, and the key writing processing unit is configured to write the decrypted first key to the service key storage region, when the mobile information terminal receives, from the second server, the second key encrypted by the first key managed in the second server, the mobile information terminal transmits, to the communication unit, the second key encrypted by the first key, when the communication unit receives, from the mobile information terminal, the second key encrypted by the first key, the cryptographic processing unit is configured to decrypt the second key by the first key stored in the service key storage region, the home appliance holds the decrypted second key, the mobile information terminal transmits, to the communication unit, a request for reading of the second key held in the home appliance, when the communication unit receives, from the mobile information terminal, the request for reading of the second key, the cryptographic processing unit is configured to encrypt, by the master key stored in the master key storage region, the second key held in the home appliance, and the second key encrypted by the master key is transmitted to the mobile information terminal, the mobile information terminal receives, from the communication unit, the second key encrypted by the master key, and transmits, to the communication unit, the second key and a request for writing of the second key, and when the communication unit receives, from the mobile information terminal, the second key encrypted by the master key and the request for writing of the second key, the cryptographic processing unit is configured to decrypt the second key by the master key stored in the master key storage region, and the key writing processing unit is configured to write the decrypted second key to the service key storage region.

With the above structure, it is possible that a third party key (the second key) which is managed in a third party server (the second server) different from a management server (the first server) managing a service platform is written to the service key storage region in the home appliance securely without publishing the third party key to the management server.

In addition, the above use of the mobile information device allows a home appliance not having enough function to communicate with the above-described servers to securely write the third party key into the home appliance.

For example, it is possible that in the mobile information terminal, a plurality of application programs are installed, each of the application programs corresponding to a corresponding one of a plurality of second servers including the second server, and each of the application programs being used in cryptographic communication between the home appliance and the corresponding one of the second servers, the mobile information terminal receives a plurality of encrypted second keys including the second key encrypted by the master key from the communication unit and holds the second keys, each of the second keys corresponding to a corresponding one of the application programs, when switching is performed among the application programs, the mobile information terminal transmits, to the communication unit, (a) a target encrypted second key corresponding to an application program selected in the switching from the application programs, and (b) a request for writing of the target encrypted second key, and when the communication unit receives, from the mobile information terminal, the target encrypted second key and the request for writing, the cryptographic processing unit is configured to decrypt the target encrypted second key by the master key stored in the master key storage region, and the key writing processing unit is configured to write the decrypted second key to the service key storage region.

With the above structure, it is possible that the mobile information terminal has a plurality of the encrypted second keys each corresponding to a corresponding one of a plurality of applications. Therefore, in writing a key to the service key storage region next time, the mobile information terminal can transmit an encrypted second key held in the mobile information terminal to the home appliance. As a result, when a plurality of application programs are installed in the mobile information terminal, it is possible to shorten a time required to write a second key after switching an application program to another.

Furthermore, as the mobile information terminal has a plurality of encrypted second keys, the service key storage region may have a memory size for only one key.

For example, it is also possible that the home appliance holds home appliance information regarding the home appliance, when the communication unit receives the home appliance information from the home appliance, the cryptographic processing unit is configured to encrypt the home appliance information by the master key stored in the master key storage region and transmits the home appliance information encrypted by the master key to the mobile information terminal, and the mobile information terminal receives the home appliance information encrypted by the master key from the communication unit, and transmits the home appliance information encrypted by the master key to the first server.

With the above structure, it is possible to perform cryptographic communication between the management server and the home appliance by using the master key stored in the master key storage region in the home appliance. As a result, it is possible to prevent leakage of the home appliance information which is accumulated in the home appliance and includes privacy information.

For example, it is further possible that the home appliance holds home appliance information regarding the home appliance, when the communication unit receives the home appliance information from the home appliance, the cryptographic processing unit is configured to encrypt the home appliance information by the second key stored in the service key storage region, and the home appliance information encrypted by the second key is transmitted to the mobile information terminal, and the mobile information terminal receives the home appliance information encrypted by the second key from the communication unit, and transmits the home appliance information encrypted by the second key to the second server.

With the above structure, it is possible to perform cryptographic communication between the third party server and the home appliance by using the second key stored in the service key storage region in the home appliance. As a result, it is possible to prevent leakage of the home appliance information which is accumulated in the home appliance and includes privacy information.

In addition, with the above structure, the management server and the third party server can perform end-to-end communication with the home appliance, by using respective keys stored in respective different storage regions in the home appliance. As a result, a user can simultaneously use, in the mobile information terminal, an application corresponding to the management server and an application corresponding to the third party server.

For example, it is still further possible that the home appliance further includes: a locked-state holding unit configured to hold lock information, the lock information being used to (i) lock the service key storage region to prohibit a key from being re-written or (ii) unlock the service key storage region to allow a key to be re-written; and a locked-state setting unit configured to update the lock information held in the locked-state holding unit to lock or unlock the service key storage region, the mobile information terminal transmits, to the communication unit, first verification information and a request for rewriting of a key stored in the service key storage region, the home appliance holds the first verification information received by the communication unit, after the rewriting is completed in response to the request from the mobile information terminal, the locked-state setting unit is configured to lock the service key storage region, the mobile information terminal transmits, to the communication unit, second verification information and a request for unlocking of the service key storage region, only when the first verification information is identical to the second verification information, the home appliance transmits the request for unlocking to the locked-state setting unit, and after receiving the request for unlocking from the home appliance, the locked-state setting unit is configured to unlock the service key storage region.

With the above structure, it is possible that, among the applications in the mobile information terminal, only a third party application that has generated the first verification information is allowed to unlock the service key storage region. As a result, it is possible to prevent unauthorized third party applications from maliciously re-writing keys in the service key storage region.

For example, it is still further possible that the communication unit is a Radio Frequency IDentification (RFID) tag that performs near field communication with the mobile information terminal.

In accordance with another aspect of the present invention, there is provided a communication device, including: a communication unit configured to communicate with a second communication device that communicates with (a) a first server managing a master key and (b) a second server managing a first key and a second key; a master key storage region in which the master key is previously stored; a service key storage region in which the first key and the second key are to be stored; a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, wherein, when the communication unit receives, from the second communication device, (a) the first key encrypted in the first server by the master key managed in the first server and (b) a request for writing of the first key, the cryptographic processing unit is configured to decrypt the first key by the master key stored in the master key storage region, and the key writing processing unit is configured to write the decrypted first key to the service key storage region, when the communication unit receives, from the second communication device, the second key encrypted in the second server by the first key managed in the second server, the cryptographic processing unit is configured to decrypt the second key by the first key stored in the service key storage region, and the communication device holds the decrypted second key, when the communication unit receives, from the second communication device, a request for reading of the second key held in the communication device, the cryptographic processing unit is configured to encrypt, by the master key stored in the master key storage region, the second key held in the communication device, and the encrypted second key is transmitted to the second communication device, and when the communication unit receives, from the second communication device, (a) the second key that is encrypted by the master key and transmitted to the second communication device and (b) a request for writing of the second key, the cryptographic processing unit is configured to decrypt the second key by the master key stored in the master key storage region, and the key writing processing unit is configured to write the decrypted second key to the service key storage region.

For example, it is possible that the communication device further includes: a locked-state holding unit configured to hold lock information, the lock information being used to (i) lock the service key storage region to prohibit a key from being re-written or (ii) unlock the service key storage region to allow a key to be re-written; and a locked-state setting unit configured to update the lock information held in the locked-state holding unit to lock or unlock the service key storage region, wherein when the communication unit receives, from the second communication device, (a) a request for re-writing of a key stored in the service key storage region and (b) first verification information, the communication device holds the first verification information received by the communication unit, after the re-writing is completed in response to the request for the re-writing from the second communication device, the locked-state setting unit is configured to lock the service key storage region, when the communication unit receives, from the second communication device, (a) a request for unlocking of the service key storage region and (b) second verification information, only when the first verification information is identical to the second verification information, the communication device transmits the request for unlocking to the locked-state setting unit, and after receiving the request for unlocking from the communication device, the locked-state setting unit is configured to unlock the service key storage region.

For example, it is also possible that the communication device is a home appliance, and the second communication device is a mobile information terminal.

For example, it is further possible that the communication unit is a Radio Frequency IDentification (RFID) tag that performs near field communication with the second communication device.

In accordance with still another aspect of the present invention, there is provided a key management method of writing, into a home appliance, a second key to be used in cryptographic communication between the home appliance and a second server, by using a mobile information terminal that communicates with (a) a first server managing a master key and (b) the second server managing a first key and the second key, the home appliance including: a communication unit configured to communicate with the mobile information terminal; a master key storage region in which the master key is previously stored; a service key storage region in which the first key and the second key are to be stored; a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, the key management method including: when the mobile information terminal receives, from one of the first server and the second server, the first key encrypted by the master key managed in the first server, the mobile information terminal transmits (a) the first key encrypted by the master key and (b) a request for writing of the first key, when the communication unit receives the first key encrypted by the master key and the request for writing of the first key from the mobile information terminal, the cryptographic processing unit is configured to decrypt the first key by the master key stored in the master key storage region, and the key writing processing unit is configured to write the decrypted first key to the service key storage region, when the mobile information terminal receives, from the second server, the second key encrypted by the first key managed in the second server, the mobile information terminal transmits, to the communication unit, the second key encrypted by the first key, when the communication unit receives, from the mobile information terminal, the second key encrypted by the first key, the cryptographic processing unit is configured to decrypt the second key by the first key stored in the service key storage region, the home appliance holds the decrypted second key, the mobile information terminal transmits, to the communication unit, a request for reading of the second key held in the home appliance, when the communication unit receives, from the mobile information terminal, the request for reading of the second key, the cryptographic processing unit is configured to encrypt, by the master key stored in the master key storage region, the second key held in the home appliance, and the second key encrypted by the master key is transmitted to the mobile information terminal, the mobile information terminal receives, from the communication unit, the second key encrypted by the master key, and transmits, to the communication unit, the second key and a request for writing of the second key, and when the communication unit receives, from the mobile information terminal, the second key encrypted by the master key and the request for writing of the second key, the cryptographic processing unit is configured to decrypt the second key by the master key stored in the master key storage region, and the key writing processing unit is configured to write the decrypted second key to the service key storage region.

In this case, an example of the communication device is a mobile information terminal, and an example of the second communication device is a home appliance.

These general and specific aspects may be implemented using a device, a method, an integrated circuit, a computer program, or a computer-readable recording medium such as a CD-ROM, or any combination of devices, methods, integrated circuits, computer programs, or computer-readable recording media.

Hereinafter, certain exemplary embodiments are described in greater detail with reference to the accompanying Drawings.

It should be noted that all the embodiments described below are specific examples of the present invention. Numerical values, shapes, materials, constituent elements, arrangement positions and the connection configuration of the constituent elements, steps, the order of the steps, and the like described in the following embodiments are merely examples, and are not intended to limit the present invention. Therefore, among the constituent elements in the following embodiments, constituent elements that are not described in independent claims that show the most generic concept of the present invention are described as elements constituting more desirable configurations, although such constituent elements are not necessarily required to achieve the object of the present invention.

(First Embodiment 1)
<Structure of RFID Tag Service System>

FIG. 1 is a configuration diagram of an RFID tag service system 10 that offers services between a home appliance and servers, by using RFID tag communication according to Embodiment 1.

The RFID tag service system 10 is equivalent to a key management system. The RFID tag service system 10 includes a management server 20 (first server), a 3rd party server 30 (second server), a mobile information terminal 40, and a home appliance 60 having an RFID tag 70 (communication unit). The mobile information terminal 40 is a mobile device, such as a mobile telephone or a smartphone, which has a near field communication function.

The near field communication function according to the present embodiment is, for example, a communication function defined in the RFID standard using a frequency having a frequency band of 13.56 MHz. The RFID standard is defined in ISO 14443 Type A, ISO 14443 Type B, and ISO 15693. Furthermore, the near field communication function may be an NFC standard that is an international standard of the near field communication technology defined to deal with these RFID standards together. Hereinafter, in the present embodiment, description is given for the case where RFID communication is used as communication using a near field communication function.

The management server 20 is a server managed by a provider that provides a service platform using the RFID tag 70.

The third party server 30 is a server managed by a service provider that wishes to offer its services on the above service platform.

The mobile information terminal 40 is connected to the management server 20 and the third party server 30 via a network. Here, the network is, for example, a mobile telephone network.

In the mobile information terminal 40, an application 50 using an RFID tag reader/writer function is installed. The application 50 reads home appliance information accumulated in the home appliance 60 via the RFID tag 70.

The mobile information terminal 40 transmits the home appliance information, which has been read from the home appliance 60 by the RFID communication, to the management server 20 or the third party server 30. The management server 20 or the third party server 30 provides services to a user based on the received home appliance information.

Examples of the services are presentation of histories such as power consumption amounts of respective home appliances to the user, and transmission of control commands from the server to the home appliance, setting information of the home appliance, and the like. It should be noted that the details of such services are not essential in the present invention, so that they are not mentioned in the present embodiment.

<Structure of Mobile Information Terminal>

Figure 2:
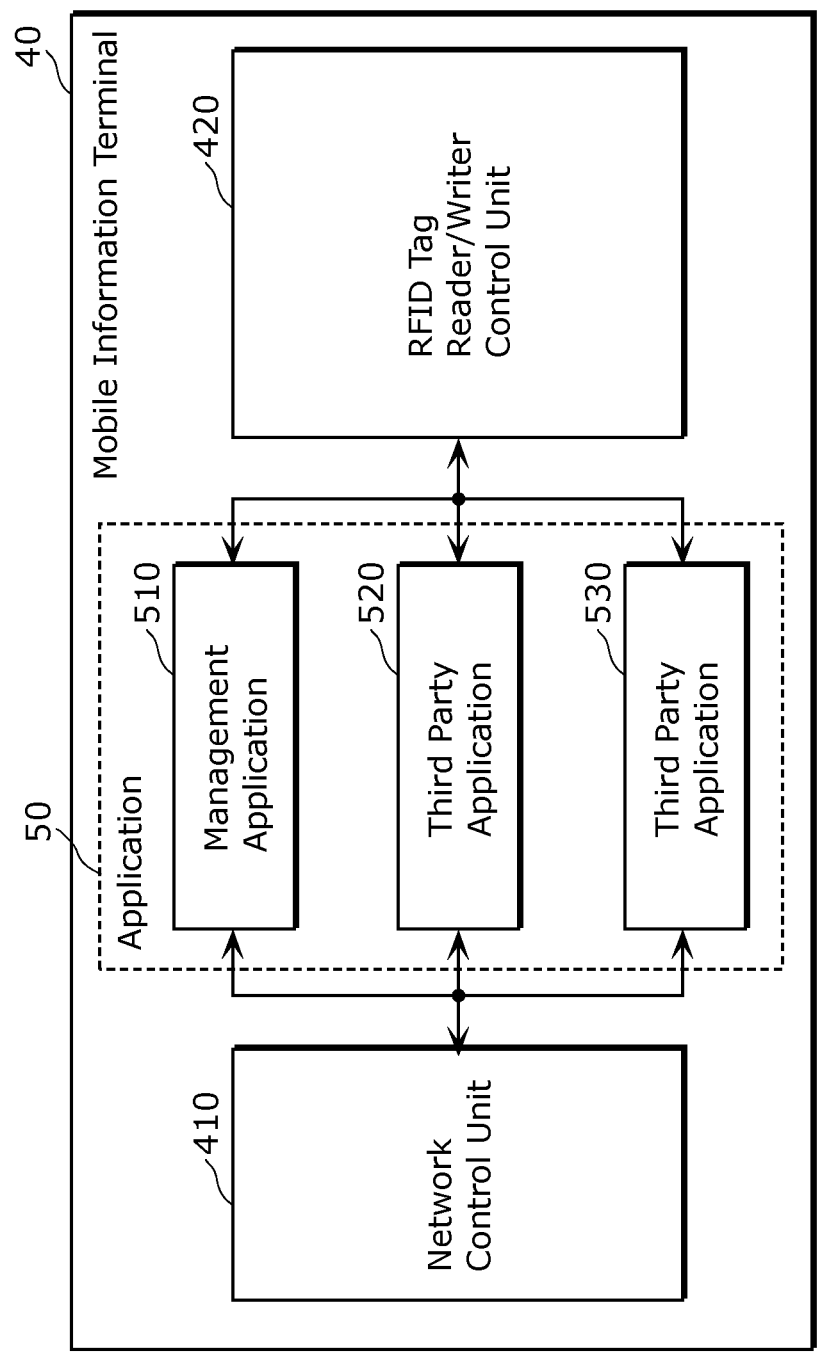
FIG. 2 is a block diagram of a mobile information terminal according to Embodiment 1.

FIG. 2 is a block diagram of the mobile information terminal 40 according to Embodiment 1.

The mobile information terminal 40 includes a network control unit 410, an RFID tag reader/writer control unit 420, and an application 50.

The network control unit 410 controls a network device to be connected to an external network device. The external network device is a wireless network device or a wired network device. In other words, the network control unit 410 controls connection to an IP network or connection to a mobile telephone communication network.

The RFID tag reader/writer control unit 420 controls the reader/writer function for the RFID tag 70.

The application 50 includes: a management application 510 that is released by the tag service platform provider; and third party applications 520 and 530 that are released by service providers that are third parties different from the tag service platform provider.

The management application 510 and the third party applications 520 and 530 are, more specifically, RFID applications using the RFID tag reader/writer function. These applications may be previously installed in the mobile information terminal 40, or installed therein after being downloaded from an application distribution server (not shown) to the mobile information terminal 40.

In the present embodiment, the third party application 520 and the third party application 530 are assumed to be released by different third party service providers. Furthermore, the respective third party service providers are assumed to be authorized third party service providers that are authorized to use the RFID tag service platform. Accesses are controlled so that only the management application 510 and the third party applications 520 and 530 issued by the authorized third party service providers can access the home appliance 60 via the RFID tag 70. The mechanism of the access control is described with reference to a key relationship diagram of FIG. 5.

Each of the service providers holds a server which the service provider itself can manage, and gathers pieces of home appliance information of the home appliance 60 via the application created by the service provider itself. More specifically, pieces of home appliance information gathered by using the management application 510 are transmitted to the management server 20, pieces of home appliance information gathered by using the third party application 520 are transmitted to the third party server 30, and pieces of home appliance information gathered by the third party application 530 are transmitted to a third party server (not shown) corresponding to the third party application 530.

<Structure of Home Appliance>

Figure 3:
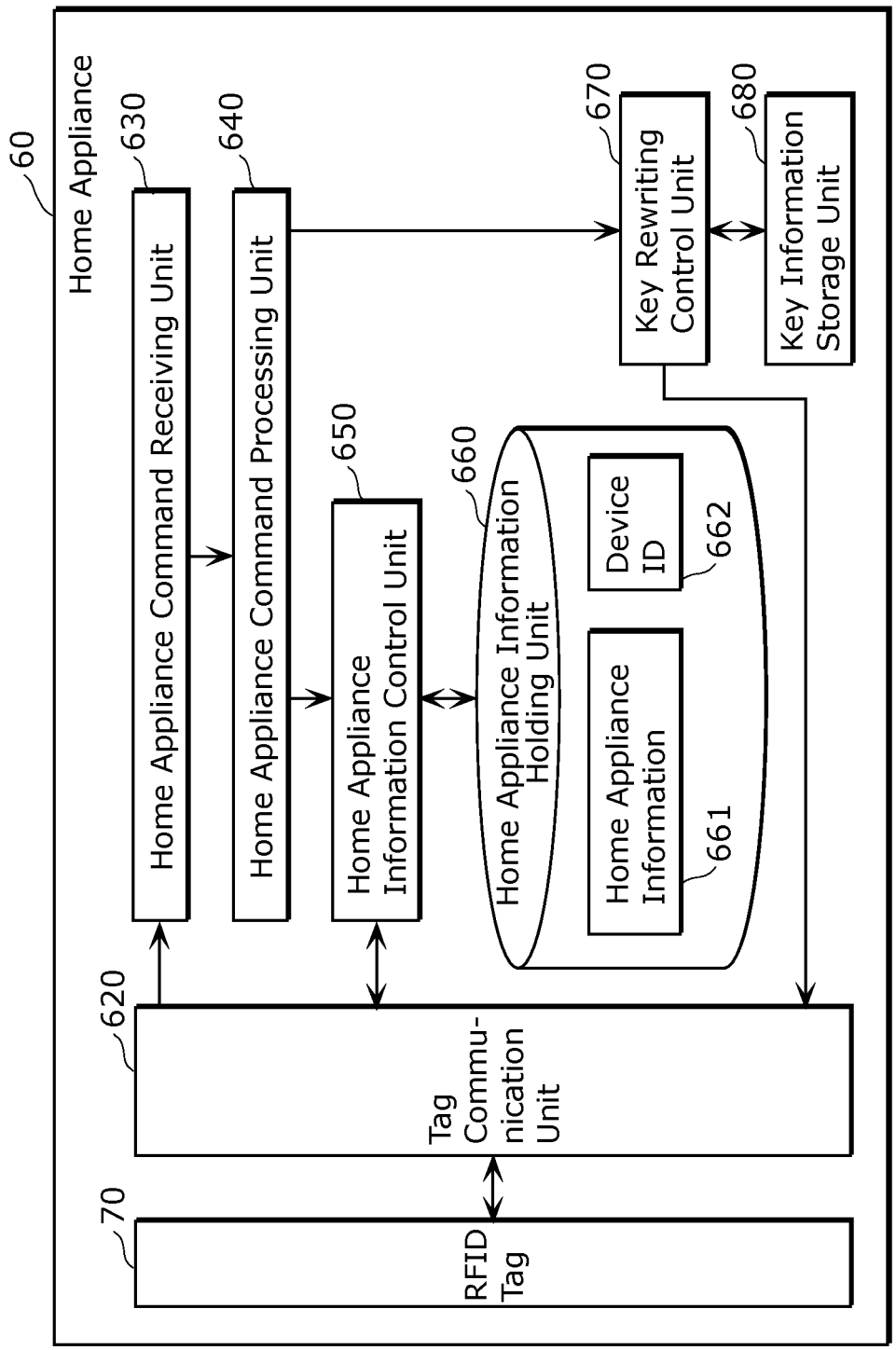
FIG. 3 is a block diagram of a home appliance according to Embodiment 1.

FIG. 3 is a block diagram of the home appliance 60 according to Embodiment 1.

The home appliance 60 has the RFID tag 70. The home appliance 60 includes: a tag communication unit 620 that controls communication with the RFID tag 70; a home appliance command receiving unit 630 that receives a home appliance command; a home appliance command processing unit 640 that processes the received command; a home appliance information control unit 650 that controls information stored in a home appliance information holding unit 660; a key rewriting control unit 670 that controls rewriting of a key set in the RFID tag 70; and a key information storage unit 680 that temporarily stores a key to be rewritten.

The home appliance information holding unit 660 holds home appliance information 661 and device ID 662 for identifying the home appliance. Examples of the home appliance information 661 are setting information of the home appliance, history information of the home appliance, power consumption information of the home appliance, and the like.

The home appliance command receiving unit 630 receives a home appliance command from the application 50 in the mobile information terminal 40 via the RFID tag 70. Furthermore, when a user presses a button of the home appliance 60, the home appliance command receiving unit 630 performs command processing corresponding to the pressed button. More specifically, for example, the home appliance command receiving unit 630 receives a user's command via a remote controller.

Here, examples of the home appliance 60 are: Audio/Visual (AV) home appliances, such as a television set, a DVD player, and a BD player; life home appliances, such as a refrigerator, a washing machine, a vacuum cleaner, a microwave, and a rice cooker; wellness home appliances, such as a sphygmomanometer, a human body composition measurement device, and an activity amount measurement device; and medical equipments such as a blood sugar level measurement device. In the present embodiment, it is assumed that the home appliance 60 is not connected to a network such as an IP network. That is, it is assumed that the home appliance 60 does not communicate directly with the management server 20 and the third party server 30.

<Structure of RFID Tag>

Figure 4:
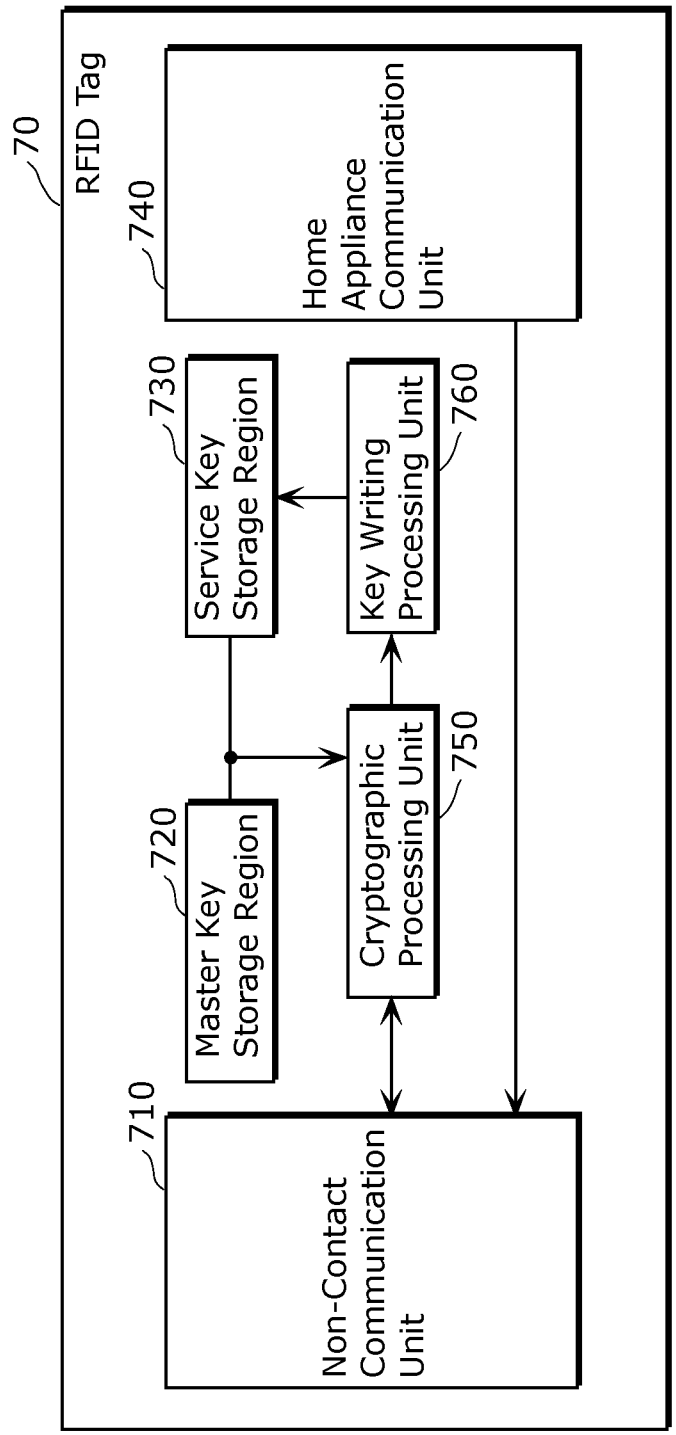
FIG. 4 is a block diagram of an RFID tag according to Embodiment 1.

FIG. 4 is a block diagram of the RFID tag.

The RFID tag 70 includes: a non-contact communication unit 710 that controls RFID communication with the mobile information terminal 40; a home appliance communication unit 740 that controls communication between the RFID tag 70 and the home appliance 60; a master key storage region 720 that is an area holding a master key; a service key storage region 730 that is an area holding a key for services provided from a third party is stored; a cryptographic processing unit 750; and a key writing processing unit 760 that rewrites the key stored in the service key storage region 730.

When the RFID tag 70 receives a key, the service key storage region 730 stores the received key only if the key is encrypted by the master key. As a result, only keys requested by authorized third party applications to be written are written into the service key storage region 730. In the present embodiment, the number of keys which the service key storage region 730 can hold is assumed to be one.

The RFID tag 70 receives encrypted data by using the non-contact communication unit 710. The cryptographic processing unit 750 decrypts encrypted data by using the key stored in the master key storage region 720 or the key stored in the service key storage region 730. The resulting decrypted data is provided to the home appliance 60 via the home appliance communication unit 740.

On the other hand, by using the home appliance communication unit 740, the RFID tag 70 receives, from the home appliance 60, the home appliance information 661 held in the home appliance information holding unit 660. The cryptographic processing unit 750 in the RFID tag 70 decrypts the received home appliance information 661 by using the key stored in the master key storage region 720 or the key stored in the service key storage region 730.

After that, the decrypted home appliance information 661 is transmitted to the mobile information terminal 40 by RFID communication performed via the non-contact communication unit 710. Furthermore, the mobile information terminal 40 transmits the received encrypted home appliance information 661 to the management server 20 or the third party server 30. The management server 20 or the third party server 30 decrypts the received encrypted home appliance information 661 and accumulates the decrypted information as plaintext data into a database. As a result, the accumulated data is used for various services.

Figure 5:
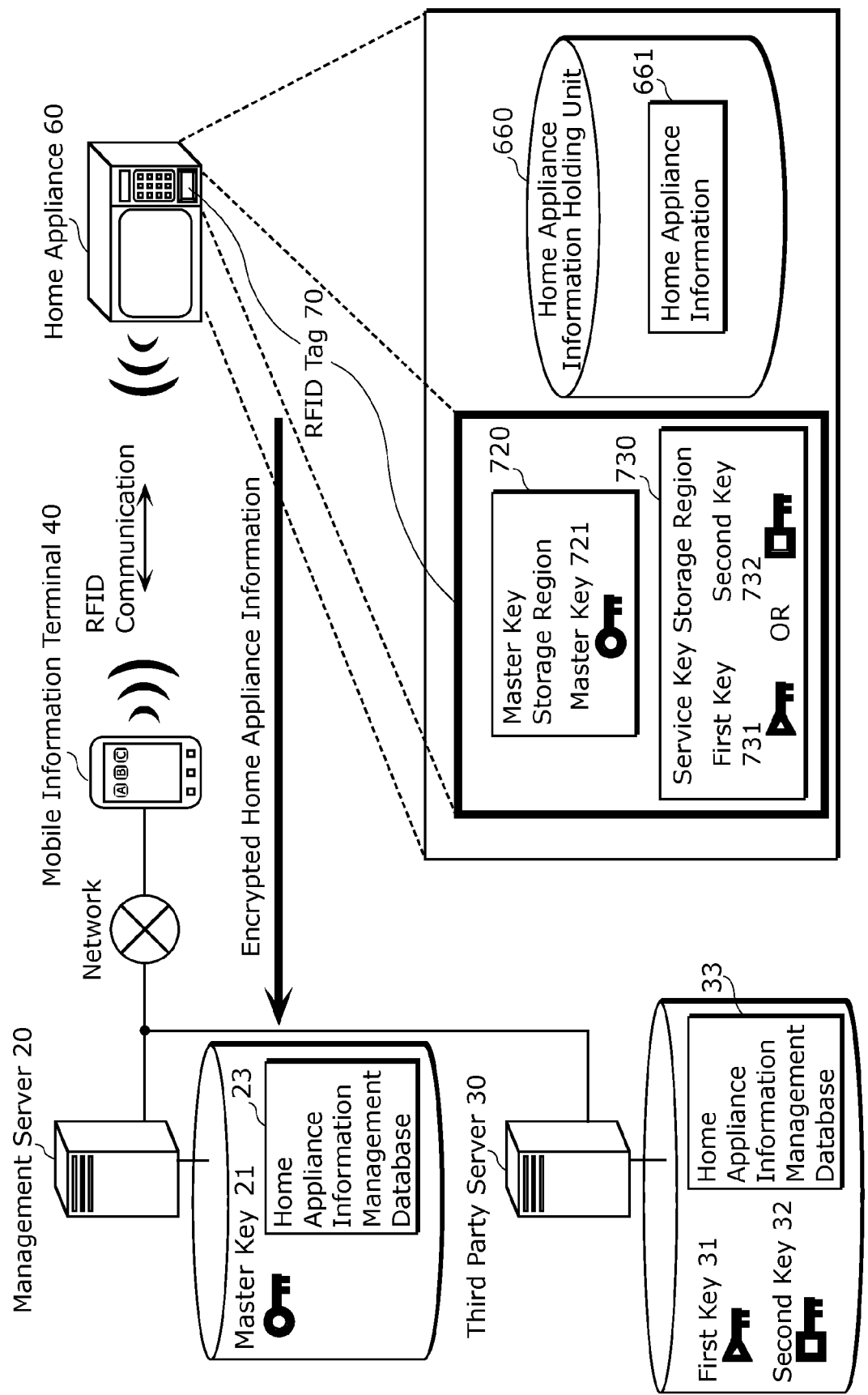
FIG. 5 is a relationship diagram of keys used in cryptographic processing in the RFID tag service system according to Embodiment 1.

The following describes a relationship between data cryptographic processing and key processing in more detail with reference to FIG. 5.

<Relationship Between Data Cryptographic Processing and Key Processing>

FIG. 5 is a relationship diagram between keys used in cryptographic processing performed by the RFID tag service system 10.

The management server 20 holds a master key 21. The management server 20 also holds a list (not shown) of authorized third parties. In receiving a request for encryption of a first key 31, from an authorized third party server, the management server 20 encrypts the first key 31 by the master key 21 held in the management server 20 and sends the encrypted first key back to the authorized third party server.

The RFID tag 70 holds a master key 721. The master key 721 is written into the master key storage region 720 during manufacturing of the home appliance 60. Here, the master key 721 and the master key 21 are the same key.

The service key storage region 730 in the RFID tag 70 is empty at the stage of the manufacturing. In receiving a request for writing, from the third party application 520 released by the third party service provider, the first key 31 or a second key 32 which is held in the third party server 30 is written into the service key storage region 730.

Here, it is necessary that only keys provided from authorized third party applications are allowed to be written into the service key storage region 730. Therefore, keys to be written into the service key storage region 730 are restricted only to keys obtained by decrypting keys encrypted by the master key 21. As a result, in order to write the first key 31 and the second key 32 into the service key storage region 730, the RFID tag 70 needs to receive the first key 31 encrypted by the master key 21, the second key 32 encrypted by the master key 21, and respective requests for writing of these keys.

The first key 31 is a key to be published to the management server 20. The first key 31 is encrypted by the master key 21 in the management server 20. The first key 31 is temporarily stored in the service key storage region 730.

On the other hand, the second key 32 is a key that is not published to the management server 20. The second key 32 is used in end-to-end cryptographic communication between the third party server 30 and the RFID tag 70.

In order to write the second key 32 into the service key storage region 730, it is necessary to provide the second key encrypted by the master key 21 (hereinafter, referred to also simply as an "encrypted second key") to the RFID tag 70, in the same manner as the first key 31. The second key encrypted by the master key is generated by using RFID communication of the RFID tag 70, not in the management server 20. The processing for writing the first key 31 and the second key 32 into the service key storage region 730 and the processing for generating the keys are described in more detail with reference to the sequence diagrams of FIGS. 9, 10, 11, and 12. Therefore, here, the writing processing is not described.

As a result, an application issued by an authorized third party can perform cryptographic communication by using the second key which is not published to the management server 20 and is known only by the authorized third party. Therefore, a risk of leaking the second key from the management server 20 is low. As a result, it is possible to prevent that data is leaked from the management server 20.

The home appliance information 661 accumulated in the home appliance information holding unit 660 is transmitted to the management server 20 or the third party server 30 by the application 50 installed in the mobile information terminal 40. The home appliance information 661 is encrypted by the cryptographic processing unit 750 in the RFID tag 70 and then transmitted to the mobile information terminal 40 by RFID communication. Network communication is used in the transmission of the encrypted home appliance information from the mobile information terminal 40 to the management server 20 or the third party server 30.

The encrypted home appliance information transmitted from the management application 510 to the management server 20 is information generated by the cryptographic processing unit 750 in the RFID tag 70 by encrypting the home appliance information 661 by the master key 721 stored in the master key storage region 720. The encrypted home appliance information received by the management server 20 is decrypted by the master key 21 and then accumulated in the home appliance information management database 23.

On the other hand, the encrypted home appliance information to be transmitted from the third party application 520 to the third party server 30 is generated by the cryptographic processing unit 750 in the RFID tag 70 by encrypting the home appliance information 661 by using the second key 732 stored in the service key storage region 730. The encrypted home appliance information received by the third party server 30 is decrypted by the second key 32, and the accumulated in the home appliance information management database 33.

As described above, the end-to-end cryptographic communication between the RFID tag 70 and the management server 20 and the end-to-end cryptographic communication between the RFID tag 70 and the third party server 30 are performed.

Figure 6:
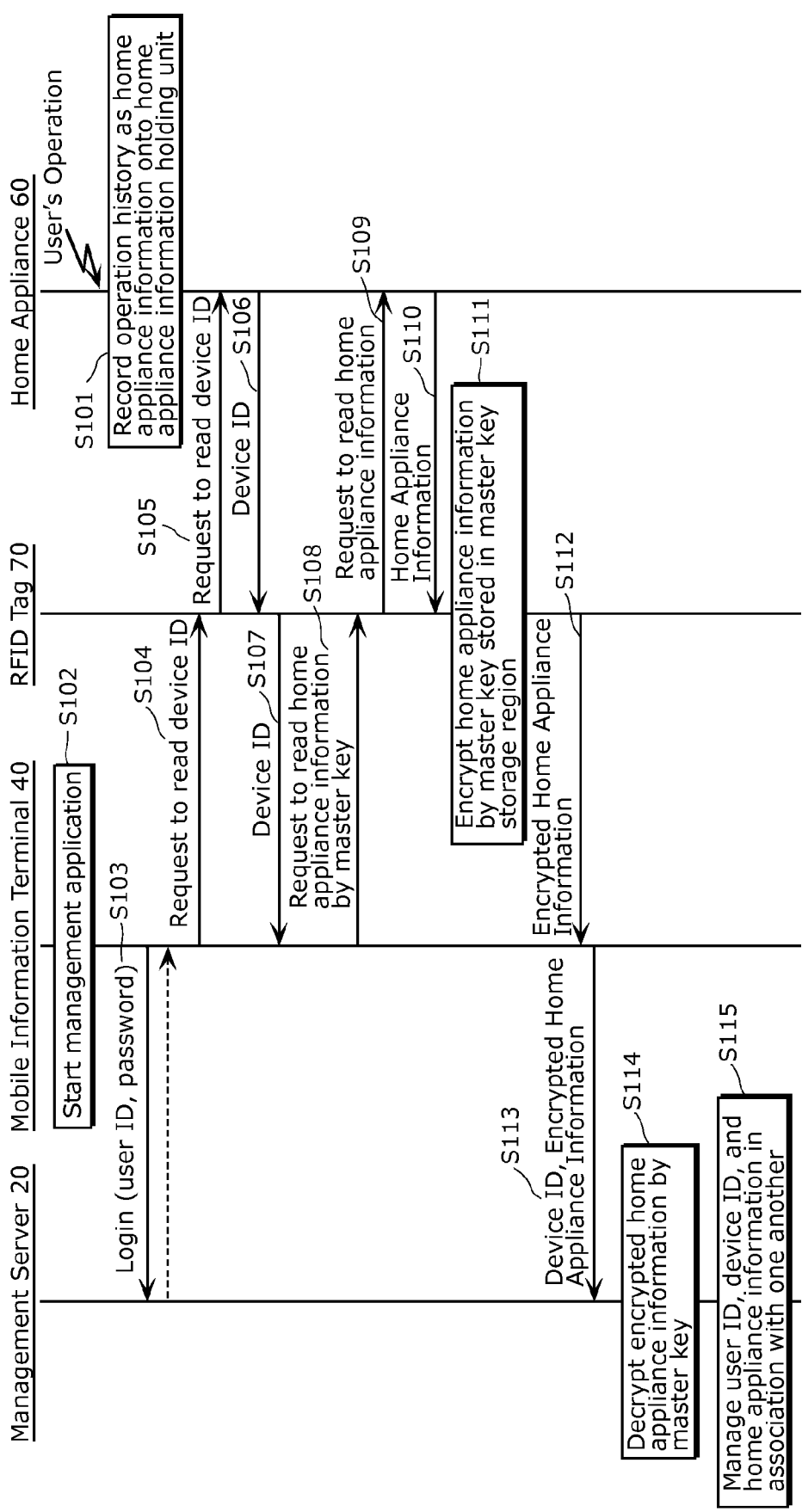
FIG. 6 is a sequence diagram of cryptographic processing between the RFID tag and a management server according to Embodiment 1.
Figure 7:
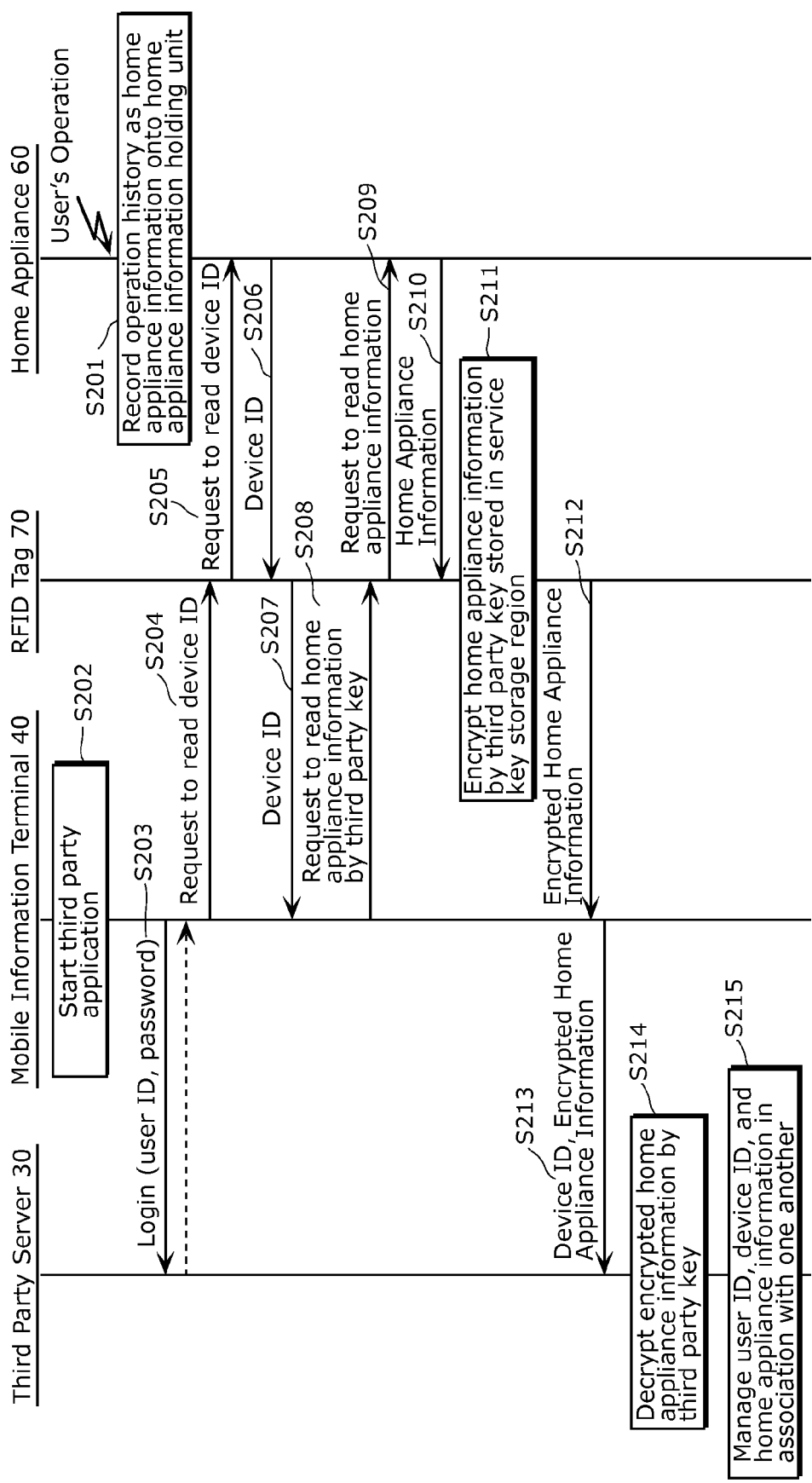
FIG. 7 is a sequence diagram of cryptographic processing between the RFID tag and a third party server according to Embodiment 1.

The following describes each of the cryptographic communications in more detail with reference to FIGS. 6 and 7, respectively.

<Cryptographic Communication Sequence Between RFID Tag and Management Server>

FIG. 6 is a sequence diagram of the cryptographic communication between the RFID tag 70 and the management server 20.

Here, it is assumed that a user using the RFID tag service system 10 has already been registered to use services, and that the management server 20 manages a user ID and a password as user registration information of the registered user.

It is also assumed in the following description that the home appliance 60 holds, by a user's operation, a home appliance operation history as home appliance information in the home appliance information holding unit 660 (S101).

First, the management application 510 installed in the mobile information terminal 40 is started (S102).

Next, the management application 510 requests the user to login, and the user inputs the user ID and the password. The management server 20 compares the input user ID and password received via the management application 510 to those in the user registration database managed by the management server 20. Here, if the input user ID and password match those in the user registration database, the management server 20 transmits a login completion notification to the management application 510 (S103). The communication between the management server 20 and the mobile information terminal 40 at Step S103 is, for example, cryptographic communication such as Secure Socket Layer (SSL).

Next, the user brings the mobile information terminal 40 close to the RFID tag 70, while the management application 510 is operating. Thereby, the management application 510 transmits a request for reading of the device ID, to the RFID tag 70 by RFID communication using the RFID tag reader/writer control unit 420 (S104).

Next, by using the non-contact communication unit 710, the RFID tag 70 receives the request for reading of the device ID. Then, the RFID tag 70 transmits the request for reading of the device ID, to the tag communication unit 620 of the home appliance 60 using the home appliance communication unit 740 (S105).

Next, the home appliance information control unit 650 in the home appliance 60 reads the device ID 662 from the home appliance information holding unit 660, and transmits the device ID 662 to the RFID tag 70 by using the tag communication unit 620 (S106).

Next, in the RFID tag 70, the home appliance communication unit 740 receives the device ID 662, and transmits the device ID 662 to the management application 510 by using the non-contact communication unit 710 (S107).

Next, the user brings the mobile information terminal 40 close to the RFID tag 70, while the management application 510 is operating. Thereby, the management application 510 transmits a request to reading the home appliance information by using the master key 721, to the RFID tag 70 by RFID communication using the RFID tag reader/writer control unit 420 (S108).

Next, in the RFID tag 70, the non-contact communication unit 710 receives the request to read the home appliance information by using the master key 721. Then, by using the home appliance communication unit 740, the RFID tag 70 transmits the request for reading of the home appliance information, to the tag communication unit 620 in the home appliance 60 (S109).

Next, the home appliance information control unit 650 in the home appliance 60 reads the home appliance information 661 from the home appliance information holding unit 660, and transmits the home appliance information 661 to the RFID tag 70 by using the tag communication unit 620 (S110).

Next, the cryptographic processing unit 750 in the RFID tag 70 encrypts the home appliance information 661, which has been received by the home appliance communication unit 740, by using the master key 721 stored in the master key storage region 720 to generate encrypted home appliance information (S111). Then, the cryptographic processing unit 750 transmits the generated encrypted home appliance information to the management application 510 by using the non-contact communication unit 710 (S112).

Next, the management application 510 transmits the device ID 662 received at Step S107 and the encrypted home appliance information received at Step S112, to the management server 20 via the network control unit 410 (S113).

Next, the management server 20 decrypts the encrypted home appliance information received at Step S113, by using the master key 21 managed by the management server 20 (S114).

Next, the management server 20 records the home appliance information 661 decrypted at Step S114, the user ID received at Step S103, and the device ID 662 received at Step S113 in association with one another into the home appliance information management database 23 (S115).

This is the end of the description for the cryptographic communication sequence between the RFID tag 70 and the management server 20.

It should be noted in the present embodiment that the device ID 662 is outputted without being encrypted by the master key 721 in the RFID tag 70, but the device ID 662 may be encrypted by the master key 721 in the same manner as the home appliance information 661.

<Cryptographic Communication Sequence between RFID Tag and Third Party Server>

FIG. 7 is a sequence diagram of the cryptographic communication between the RFID tag 70 and the third party server 30.

FIG. 7 differs from FIG. 6 in the following three points. First, a target application is the third party application 520. Second, a key used to encrypt the home appliance information 661 is the key stored in the service key storage region 730. Third, a destination of the transmitted encrypted home appliance information is the third party server 30. Except the above three points, FIG. 7 is basically the same as FIG. 6.

Here, like FIG. 6, it is assumed that the user using the RFID tag service system 10 has already been registered as a user allowed to use services, and the third party server 30 manages a user ID and a password as user registration information of the user.

It is also assumed in the following description that the home appliance 60 holds, by a user's operation, a home appliance operation history as home appliance information in the home appliance information holding unit 660 (S201).

First, the third party application 520 installed in, the mobile information terminal 40 is started (S202).

Next, the third party application 520 requests the user to login, and the user inputs the user ID and the password. The third party server 30 compares the input user ID and password received via the third party application 520 to those in the user registration database managed by the third party server 30. Here, if the user ID and the password match those in the user registration database, the third party server 30 transmits a login completion notification to the third party application 520 (S203). The communication between the third party server 30 and the mobile information terminal 40 at Step S203 is, for example, cryptographic communication such as SSL.

Next, the user brings the mobile information terminal 40 close to the RFID tag 70 while the third party application 520 is operating. Thereby, the third party application 520 transmits a request for reading of the device ID, to the RFID tag 70 by RFID communication using the RFID tag reader/writer control unit 420 (S204).

Next, by using the non-contact communication unit 710, the RFID tag 70 receives the request for reading of the device ID. Then, the RFID tag 70 transmits the request for reading of the device ID, to the tag communication unit 620 of the home appliance 60 using the home appliance communication unit 740 (S205).

Next, the home appliance information control unit 650 in the home appliance 60 reads the device ID 662 from the home appliance information holding unit 660, and transmits the device ID 662 to the RFID tag 70 by using the tag communication unit 620 (S206).

Next, in the RFID tag 70, the home appliance communication unit 740 receives the device ID 662, and transmits the device ID 662 to the third party application 520 by using the non-contact communication unit 710 (S207).

Next, the user brings the mobile information terminal 40 close to the RFID tag 70 while the third party application 520 is operating. Thereby, the third party application 520 transmits a request to read home appliance information by using the third party key (second key 732), to the RFID tag 70 by RFID communication using the RFID tag reader/writer control unit 420 (S208).

Next, in the RFID tag 70, the non-contact communication unit 710 receives the request to read the home appliance information by using the third party key. Then, by using the home appliance communication unit 740, the RFID tag 70 transmits the request for reading of the home appliance information, to the tag communication unit 620 in the home appliance 60 (S209).

Next, the home appliance information control unit 650 in the home appliance 60 reads the home appliance information 661 from the home appliance information holding unit 660, and transmits the home appliance information 661 to the RFID tag 70 by using the tag communication unit 620 (S210).

Next, the cryptographic processing unit 750 in the RFID tag 70 encrypts the home appliance information 661, which has been received by the home appliance communication unit 740, by using the second key 732 stored in the service key storage region 730 to generate encrypted home appliance information (S211). Then, the cryptographic processing unit 750 transmits the generated encrypted home appliance information to the third party application 520 by using the non-contact communication unit 710 (S212).

Next, the third party application 520 transmits the device ID 662 received at Step S207 and the encrypted home appliance information received at Step S212, to the third party server 30 via the network control unit 410 (S213).

Next, the third party server 30 decrypts the encrypted home appliance information, which has been received at Step S213, by using the second key 732 managed by the third party server 30 (S214).

Next, the management server 20 records the home appliance information 661 decrypted at Step S114, the user ID received at Step S103, and the device ID 662 received at Step S213 in association with one another into the home appliance information management database 33 (S215).

This is the end of the description for the cryptographic communication sequence between the RFID tag 70 and the third party server 30.

It should be noted in the present embodiment that the device ID 662 is outputted without being encrypted by the second key 732 in the RFID tag 70, but the device ID 662 may be encrypted by the second key 732 in the same manner as the home appliance information 661.

With reference to FIGS. 6 and 7, the description has been given for the cryptographic processing performed by the cryptographic processing unit 750 in the RFID tag 70 in the sequence of transmitting home appliance information to the management server 20 or the third party server 30. However, on the other hand, if a key is rewritten from the management server 20 or the third party server 30 to the home appliance 60, or the management server 20 or the third party server 30 sends a control command to the home appliance 60, data encrypted by the server is transmitted to the RFID tag 70. Then, the cryptographic processing unit 750 decrypts the data encrypted by the server.

It should also be noted that, although details are not given with reference to the sequences of FIGS. 6 and 7, the second key 32 is written into the service key storage region 730 after writing the first key 31 to the service key storage region 730. The details of the processing of writing a key to the service key storage region 730 are given with reference to the sequence diagrams of FIGS. 9, 10, 11, and 12.

<Home Appliance Information Management Database>

FIG. 8 is a table of the home appliance information management database 23 managed by the management server 20 at Step S115 in FIG. 6.

The home appliance information management database 23 includes a user ID 24, a device ID 25, and home appliance information 26.

In FIG. 8, two users are registered in the management server 20. One of them has a User A as a user ID 24, while the other one has a User B as a user ID 24. The user A has a microwave having a device ID 25 that is 10001, a refrigerator having a device ID that is 20001, and a rice cooker having a device ID that is 30001.

The home appliance information management database 23 holds pieces of microwave history information 1 and 2 as pieces of home appliance information 26 regarding a microwave. The home appliance information management database 23 holds pieces of refrigerator history information 1 and 2 as pieces of home appliance information 26 regarding a refrigerator. Furthermore, the home appliance management database 23 holds rice cooker history information 1 as a piece of home appliance information 26 regarding a rice cooker. For the user having User B (hereinafter, referred to as a "user B"), the home appliance management database 23 holds the same kinds of home appliance information 26 as the above, so that the pieces of home appliance information 26 of the user B are not explained again.

The home appliance information management database 33 managed by the third party server 30 has the same structure as that seen in FIG. 9, so that it is not explained.

<Summary of Third Party Key Writing Sequence>

The following describes a sequence of writing the first key 31 and the second key 32, which are third party keys, to the service key storage region 730 with reference to FIGS. 9, 10, 11, and 12.

Figure 10:
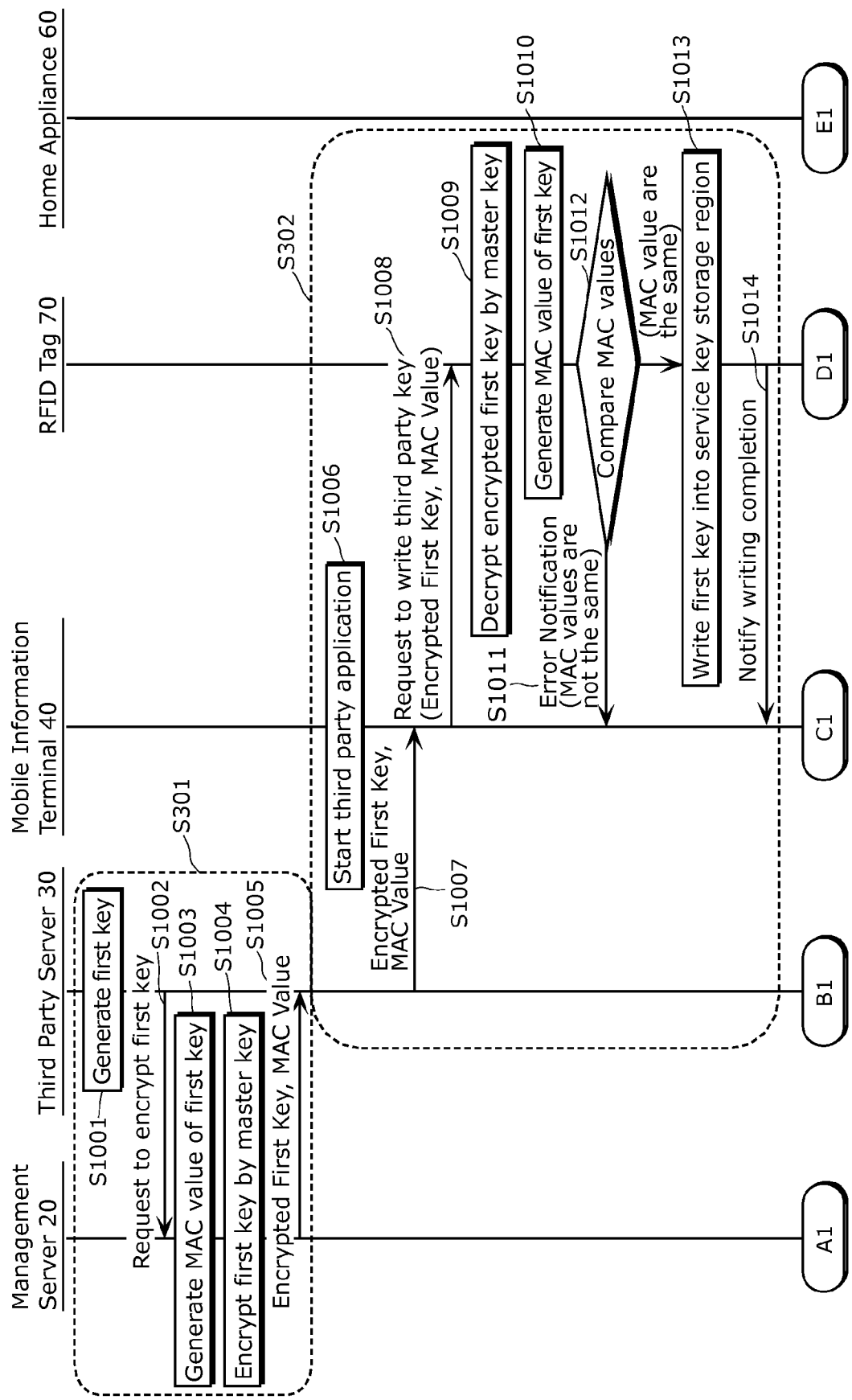
FIG. 10 is a detailed diagram of the third party key writing sequence according to Embodiment 1.
Figure 11:
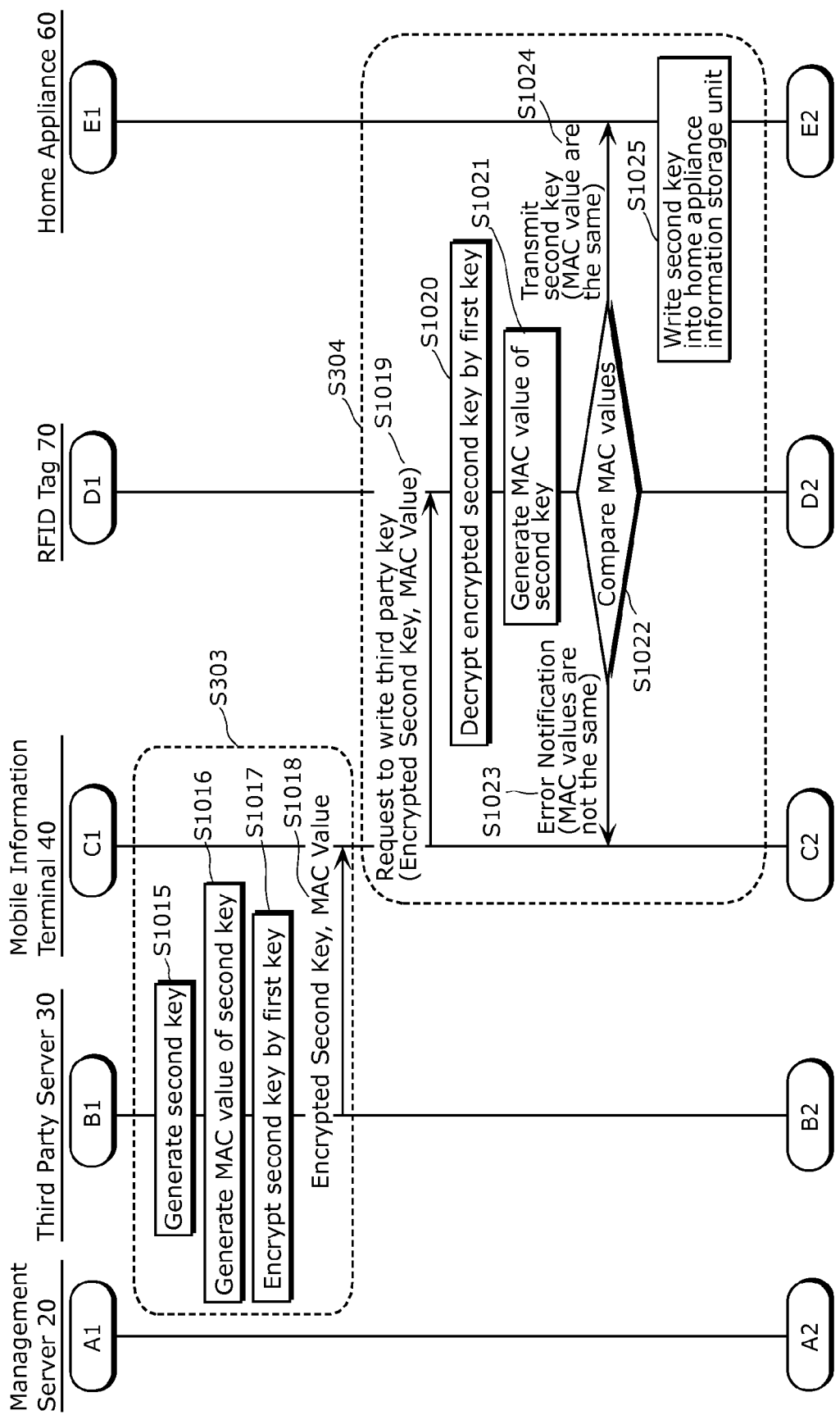
FIG. 11 is a detailed diagram of the third party key writing sequence according to Embodiment 1.
Figure 12:
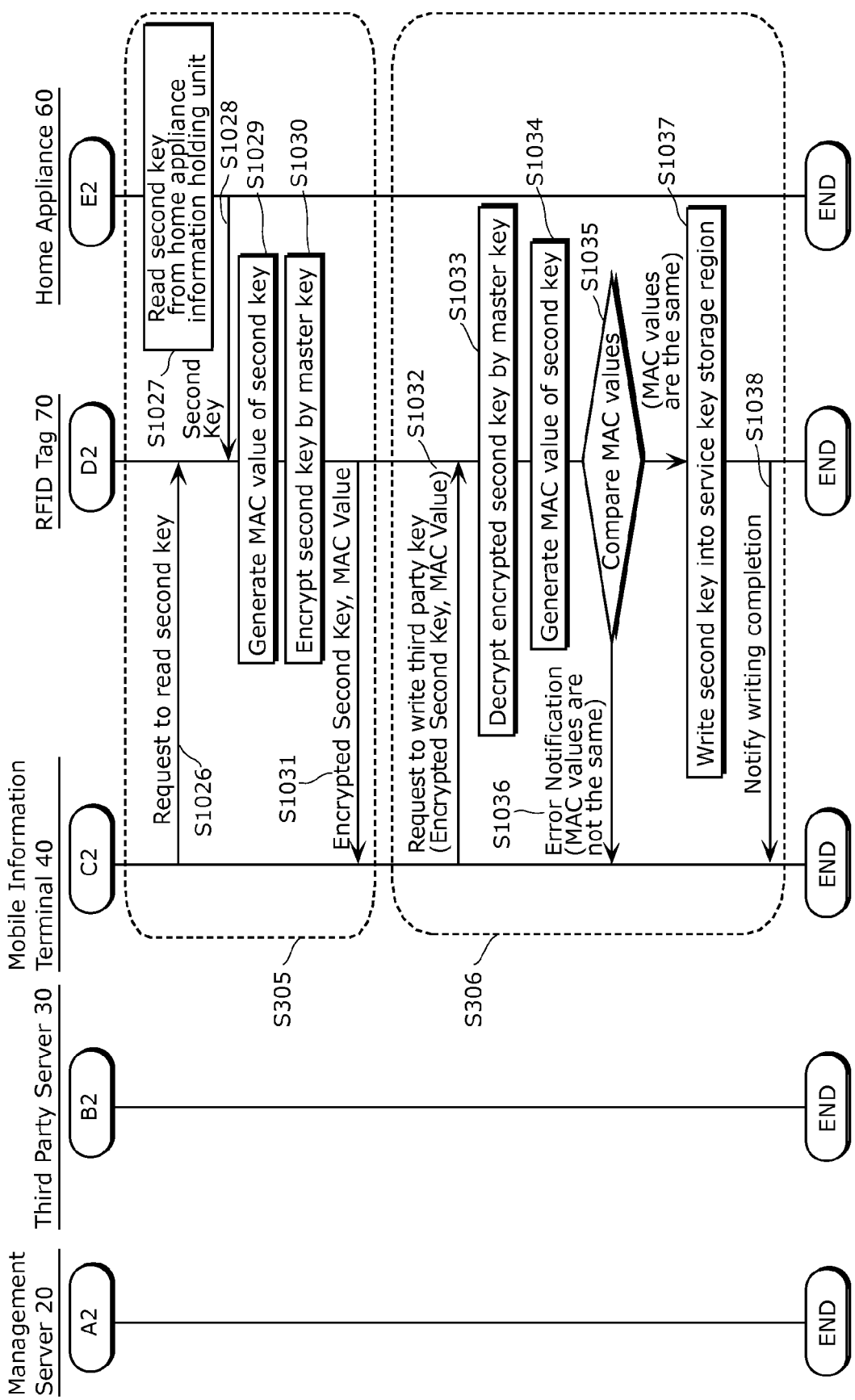
FIG. 12 is a detailed diagram of the third party key writing sequence according to Embodiment 1.

FIG. 9 is a summary sequence of writing of a third party key. Each of FIGS. 10 to 12 is a detailed sequence of a corresponding step in FIG. 9.

First, the summary sequence of FIG. 9 is described.

The third party server 30 transmits the first key 31 to the management server 20, and obtains, from the management server 20, the first key 31 encrypted by the master key 21 (S301).

Next, the mobile information terminal 40 obtains the encrypted first key from the third party server 30 and transmits the encrypted first key to the RFID tag 70. The RFID tag 70 decrypts the received encrypted first key by using the master key 721 stored in the master key storage region 720, and stores the decrypted first key 731 to the service key storage region 730 (S302).

Next, the third party server 30 transmits the second key 32 encrypted by the first key 31, to the mobile information terminal 40 (S303).

Next, the mobile information terminal 40 transmits the encrypted second key to the RFID tag 70. The RFID tag 70 decrypts the received encrypted second key by using the first key stored in the service key storage region 730, and transmits, to the home appliance 60, the second key that is decrypted to a plaintext. The home appliance 60 temporarily holds the second key decrypted by the RFID tag 70 (S304).

Next, the mobile information terminal 40 transmits, to the RFID tag 70, a request for reading of the second key stored in the home appliance 60 at Step S304. Then, the RFID tag 70 encrypts the second key, which is held in the home appliance 60, by using the master key 721. The mobile information terminal 40 obtains the encrypted second key generated by the RFID tag 70 (S305).

Next, the mobile information terminal 40 transmits, to the RFID tag 70, the encrypted second key obtained at Step S305 (second key encrypted by the master key 721). The RFID tag 70 decrypts the received encrypted second key by using the master key 721 stored in the master key storage region 720, and stores the decrypted second key 732 to the service key storage region 730 (S306).

This is the summary sequence of writing of a third party key.

<Details of Third Party Key Writing Sequence>

The following describes details of the sequence of writing of a third party key with reference to FIGS. 10, 11, and 12.

A correspondence relationship among FIGS. 9, 10, and 12 is as follows. Step S301 in FIG. 9 corresponds to Steps S1001 to S1005 in FIG. 10. Step S302 in FIG. 9 corresponds to Steps S1006 to S1014 in FIG. 10. Step S303 in FIG. 9 corresponds to Steps S1105 to S1018 in FIG. 11. Step S304 in FIG. 9 corresponds to Steps S1019 to S1025. Step S305 in FIG. 9 corresponds to Steps S1206 to S1031 in FIG. 12. Step S306 in FIG. 9 corresponds to Steps S1032 to S1038 in FIG. 12.

First, the detailed sequence of Step S301 in FIG. 9 is described with reference to FIG. 10.

The third party server 30 generates the first key 31 that is a third party key (S1001).

Next, the third party server 30 transmits a request for encryption of the first key 31, to the management server 20 (S1002).

Next, the management server 20 generates a value of a Message Authentication Code (MAC) of the first key 31 (S1003). The management server 20 encrypts the first key 31 by the master key 21 (S1004).

Next, the management server 20 transmits, to the third party server 30, the encrypted first key generated at Step S1004 and the MAC value of the first key 31 which is generated at Step S1003 (S1005). Here, at Step S1005, the management server 20 may transmit the encrypted first key and the MAC value of the first key 31 to the mobile information terminal 40. In this case, Step S1007 described later is eliminated.

The following describes the detailed sequence of Step S302 in FIG. 9 with reference to FIG. 10.

The mobile information terminal 40 starts the third party application 520 (S1006). The mobile information terminal 40 receives the encrypted first key and the MAC value of the first key 31 from the management server 20 (S1007).

Next, the third party application 520 transmits, to the RFID tag 70, a request for writing of a third party key, together with the encrypted first key and the MAC value of the first key 31, which have been obtained at Step S1007, by using RFID communication using the RFID tag reader/writer control unit 420.

Next, the cryptographic processing unit 750 in the RFID tag 70 decrypts the received encrypted first key and by using the master key 721 in the master key storage region 720 (S1009).

Next, the cryptographic processing unit 750 in the RFID tag 70 generates a MAC value of the decrypted first key (S1010).

Next, the cryptographic processing unit 750 compares the MAC value received at Step S1008 to the MAC value generated at Step S1010 (S1012). If it is determined at Step S1012 that the MAC values are not the same, the RFID tag 70 outputs an error notification (S1011).

On the other hand, if it is determined at Step S1012 that the MAC values are the same, the key writing processing unit 760 in the RFID tag 70 obtains the first key from the cryptographic processing unit 750, and writes the first key 731 to the service key storage region 730 (S1013).

After completing of the writing of the first key 731 at Step S1013, the RFID tag 70 transmits a writing completion notification to the third party application 520 (S 1014).

The following describes the detailed sequence of Step S303 in FIG. 9 is described with reference to FIG. 11.

The third party server 30 generates the second key 32 that is a third party key (S1015).

Next, the third party server 30 generates a MAC value of the second key 32 (S1016). The third party server 30 encrypts the second key 32 by using the third party server 30, thereby generating the encrypted second key (S1017).

Next, the third party server 30 transmits, to the third party application 520 in the mobile information terminal 40, the encrypted second key generated at Step S1017 and the MAC value generated at Step S1016 (S1018).

The following describes the detailed sequence of Step S304 in FIG. 9 is described with reference to FIG. 11.

By RFID communication using the RFID tag reader/writer control unit 420, the third party application 520 transmits, to the RFID tag 70, a request for writing of a third party key, together with the encrypted second key and the MAC value of the second key 32 which have been received at Step S1018 (S1019).

Next, the cryptographic processing unit 750 in the RFID tag 70 decrypts the received encrypted second key by using the first key 731 in the service key storage region 730 (S1020).

Next, the cryptographic processing unit 750 in the RFID tag 70 generates a MAC value of the decrypted second key (S1021).

Next, the cryptographic processing unit 750 compares the MAC value received at Step S1019 to the MAC value generated at Step S1021 (S1022). If it is determined at Step S1022 that these MAC values are not the same, then the RFID tag 70 outputs an error notification (S1023).

On the other hand, if it is determined at Step S1022 that the MAC values are the same, then the key writing processing unit 760 in the RFID tag 70 obtains the second key from the cryptographic processing unit 750, and transmits the obtained second key to the home appliance 60 via the home appliance communication unit 740 (S1024).

Next, the home appliance information control unit 650 in the home appliance 60 obtains the second key from the tag communication unit 620, and causes the home appliance information holding unit 660 to temporarily holds the second key (S1025).

The following describes the detailed sequence of Step S305 in FIG. 9 is described with reference to FIG. 12.

In order to store the second key to the service key storage region 730, the third party application 520 needs to obtain the second key encrypted by the master key. Therefore, the third party application 520 transmits, to the RFID tag 70, a request for reading of the second key stored in the home appliance 60 (S1026).

Next, in receiving the reading request from the RFID tag 70, the home appliance 60 reads the second key from the home appliance information holding unit 660 (S1027). The home appliance 60 transmits the readout second key to the RFID tag 70 via the tag communication unit 620 (S1028).

Next, the cryptographic processing unit 750 in the RFID tag 70 generates a MAC value of the second key received at Step S1028 (S1029). Furthermore, the cryptographic processing unit 750 encrypts the second key by using the master key 721 in the master key storage region 720 (S1030). By RFID communication using the non-contact communication unit 710, the RFID tag 70 transmits, to the third party application 520, the encrypted second key generated at Step S1030 and the MAC value generated at Step S1029 (S1031).

The following describes the detailed sequence of Step S306 in FIG. 9 is described with reference to FIG. 12.

By RFID communication using the RFID tag reader/writer control unit 420, the third party application 520 transmits, to the RFID tag 70, (a) a request for writing of a third party key, together with (b) the encrypted second key (second key encrypted by the master key) and (c) the MAC value which have been received at Step S1031 (S1032).

Next, the cryptographic processing unit 750 in the RFID tag 70 decrypts the received encrypted second key by using the master key 721 in the master key storage region 720 (S1033).

Next, the cryptographic processing unit 750 in the RFID tag 70 generates a MAC value of the decrypted second key (S1034).

Next, the cryptographic processing unit 750 compares the MAC value received at Step S1032 to the MAC value generated at Step S1034 (S1035). If it is determined at Step S1035 that the MAC values are not the same, the RFID tag 70 outputs an error notification (S1036).

On the other hand, if it is determined at Step S1035 that the MAC values are the same, the key writing processing unit 760 in the RFID tag 70 obtains the second key from the cryptographic processing unit 750, and writes the second key 732 to the service key storage region 730 (S1037).

After completion of the writing, the RFID tag 70 transmits a writing completion notification to the third party application 520 (S1038).

As described above, the second key that is not published to the management server 20 can be used in the end-to-end cryptographic communication between the third party server 30 and the RFID tag 70.

Therefore, a risk that the second key is leaked from the management server 20 is reduced to low, and it is possible to prevent that information is leaked from the management server 20.

It is desirable that the second key held in the home appliance 60 is erased at Step S1025 after being read out. It is thereby possible to prevent that the home appliance 60 is analyzed without authorization and the second key is maliciously retrieved.

It should also be noted that, at Step S1031, the third party application 520 obtains the second key encrypted by the master key (encrypted second key) and the MAC value. Here, it is desirable that the third party application 520 holds the encrypted second key and the MAC value. It is therefore not necessary to perform all of the steps in FIG. 9 to write the second key into the service key storage region 730 again. More specifically, since Step S306 in FIG. 9 is enough to write the second key to the service key storage region 730, it is possible to simplify the processing for writing the second key.

It is further desirable that, in the case where the mobile information terminal 40 has a plurality of third party applications, each of the third party applications holds a corresponding encrypted second key and a corresponding MAC value which have been received at Step S1031. In this case, only Step S306 in FIG. 9 is executed when a third party application is switched to another. As a result, a second key corresponding to the switched third party application is written. Therefore, it is possible to shorten a time required for processing caused by switching third party applications.

It should also be noted that the home appliance 60 may write the second key directly to the service key storage region 730 in the RFID tag 70. In this case, the second key corresponding to the third party application should be stored in the home appliance or the RFID tag.

Here, in general, the home appliance 60 or the RFID tag 70 often does not have enough resources. Therefore, it is often not capable of holding a plurality of second keys corresponding to respective third party applications. Addressing the above problem, by the method according to the present embodiment, the mobile information terminal 40 having enough resources is used to write the second keys, so that the home appliance 60 or the RFID tag 70 can deal with the various third party applications.

In addition, if the mobile information terminal 40 as described in the present embodiment is used, it is possible to generate a second key in the home appliance 60 or the RFID tag 70 which does not have enough resources, by updating ex-post facto the application of the mobile information terminal 40.

It should also be noted that it has been described in the present embodiment that a MAC value is used to verify a key, but it is also possible to use a widely known technique, such as digital signature or hash function, instead of the MAC value.

It should also be noted that the present embodiment is given for the case where pieces of information of life home appliances (such as a microwave, a refrigerator, and a rice cooker) are gathered as shown in FIG. 9. In this case, it can be considered that the third party server 30 provides each user with services such as power consumption information, use history, cocking menu recipe of a home appliance owned by the user, or information regarding the home appliance.

If the home appliance 60 is a wellness home appliance (such as a sphygmomanometer, a human body composition measurement device, or an activity amount measurement device) or medical equipment (such as a blood sugar level measurement device), the third party may be a medical institution. In particular, privacy information (such as a weight or a blood pressure of a user) is desirably transmitted as confidential also to the management server 20 managing the RFID service platform. Therefore, as described in the present embodiment, information of the home appliance 60 is encrypted by a key not published to the management server 20 before gathering it, so that a medical institution providing services can offer the services where privacy information for the user is protected.

It should also be noted that it has been described in the present embodiment that pieces of home appliance information gathered by the management server 20 are managed only by the management server 20, but it is also possible that the management server 20 provides the pieces of home appliance information to the third party server 30 with previous permission of the user. The cooperated processing between servers, various services can be offered.

It should also be noted that it has been described in the present embodiment that cryptographic communication using the master key is performed between the management server 20 and the RFID tag 70, but it is also possible that the cryptographic communication using the master key is performed between the management application 510 in the mobile information terminal 40 and the RFID tag 70. In this case, the management application 510 holds the master key.

Likewise, it has been described in the present embodiment that cryptographic communication using the second key that is a third party key is performed between the third party server 30 and the RFID tag 70, but it is also possible that the cryptographic communication using a third party key is performed between the third party application 520 in the mobile information terminal 40 and the RFID tag 70. In this case, the third party application 520 holds the second key.

With the above structure, when, for example, a control command is to be transmitted to the home appliance 60, the mobile information terminal 40 can encrypt the control command in the application without requesting the server to generate the encrypted control command. It is therefore possible to reduce an overhead caused by the request to the server.

It should also be noted that it has been described in the present embodiment that the number of keys storable in the service key storage region 730 is one, but the service key storage region 730 may hold a plurality of keys. In this case, the keys are distinguishable in the service key storage region 730.

With the above structure, a plurality of keys corresponding to respective third party applications are previously stored in the service key storage region 730. As a result, it is not necessary to write a key when switching among the applications, thereby further increasing a speed of the application switching.

(Embodiment 2)

The following describes an RFID tag service system according to Embodiment 2.

In Embodiment 2, after the third party application 520 rewrites a key in the service key storage region 730, control is performed to lock the service key storage region 730 so that different third party applications 530 cannot rewrite the key in the above service key storage region 730 without being authorized. The processing except the lock control is the same as described in Embodiment 1, so that only the differences from Embodiment 1 are described below.

Figure 13:
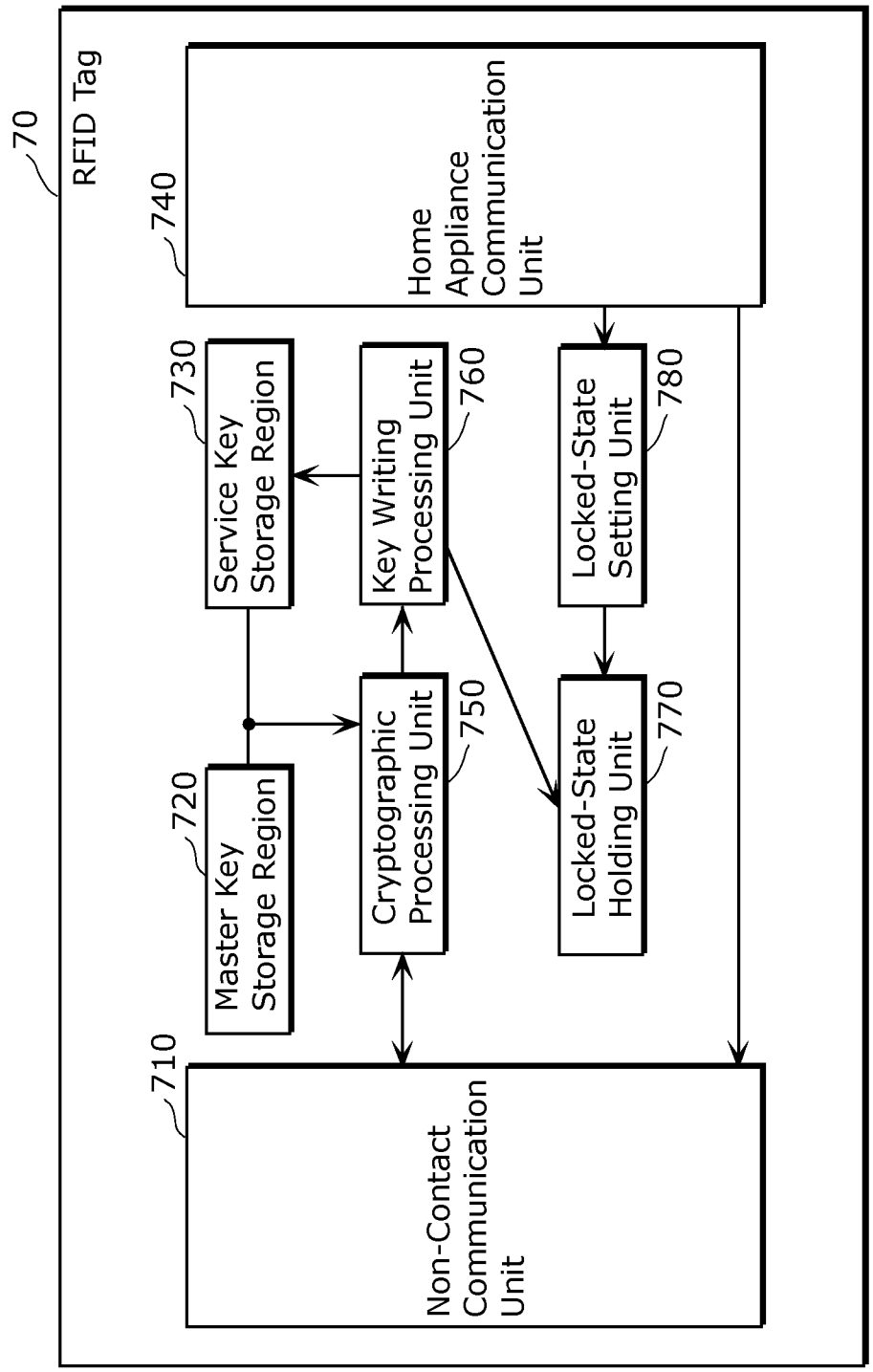
FIG. 13 is a block diagram of an RFID tag according to Embodiment 2.

FIG. 13 is a block diagram of an RFID tag according to Embodiment 2.

In addition to the units included in the RFID tag 70 shown in FIG. 4, the RFID tag 70 according to Embodiment 2 further includes: a locked-state holding unit 770 that holds lock information to be used to determine whether or not key writing is allowed; and a locked-state setting unit 780 that updates the lock information held in the locked-state holding unit 770 so as to lock (locked state) or unlock (unlocked state) the locked-state holding unit 770.

The locked state (being locked) is a state where it is impossible to rewire the key in the service key storage region 730. In other words, in the locked state, it is prohibited to write a key into the service key storage region 730. On the other hand, the unlocked state (being unlocked) is a state where it is possible to rewire a key in the service key storage region 730.

First, the processing for locking the service key storage region 730 is described.

Figure 14:
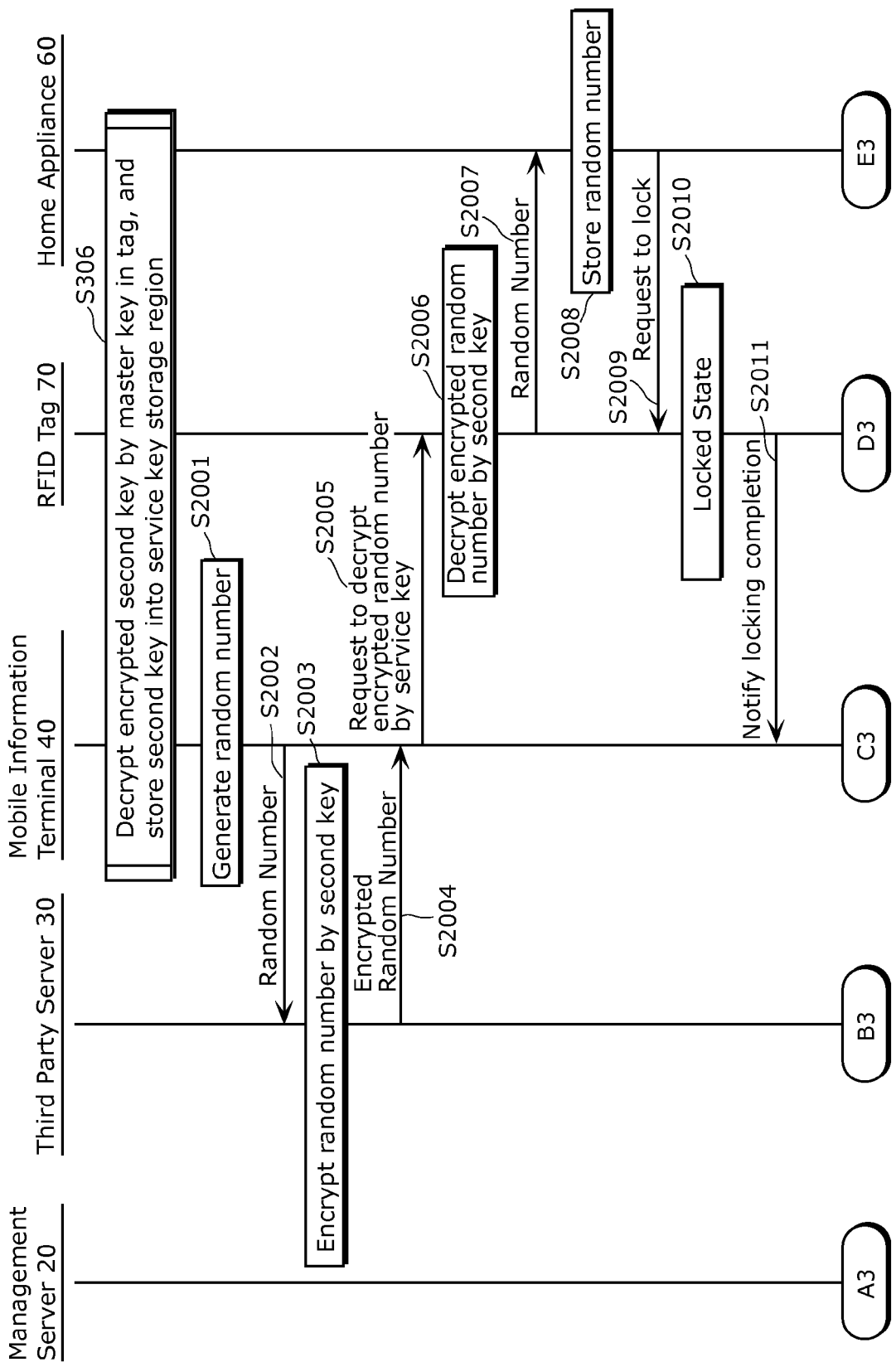
FIG. 14 is a sequence diagram of processing for locking a service key storage region according to Embodiment 2.

FIG. 14 is a sequence of locking the service key storage region 730. It should be noted that FIG. 14 is a sequence after the third party application 520 completes the writing at Step S306 in FIG. 9.

First, the third party application 520 in the mobile information terminal 40 generates a random number (S2001). The third party application 520 transmits the generated random number to the third party server 30 (S2002). Here, the communication between the third party server 30 and the third party application 520 is desirably cryptographic communication such as SSL.

Next, the third party server 30 encrypts the random number received at Step S2002 by using the second key 32 (S2003). The third party server 30 transmits the encrypted random number to the third party application 520 (S2004).

Next, the third party application 520 transmits, to the RFID tag 70, the encrypted random number received at Step S2004, together with a request to decrypt the encrypted random number by using the key stored in the service key storage region 730 (S2005).

Next, the cryptographic processing unit 750 in the RFID tag 70 decrypts the encrypted random number by the second key 732 in the service key storage region 730 (S2006). The cryptographic processing unit 750 transmits the decrypted random number to the home appliance 60 (S2007).

Next, the home appliance 60 stores the random number received at Step S2007 to the home appliance information holding unit 660.

Next, the home appliance 60 transmits a request for locking (lock request), to the RFID tag 70 (S2009). The lock request is information for requesting to lock the service key storage region 730. Here, the RFID tag 70 receives lock requests only from the home appliance communication unit 740. In other words, the RFID tag 70 does not receive lock requests from the non-contact communication unit 710. It is thereby possible to prevent that the service key storage region 730 is locked by any different third party application when a lock request is leaked out.

Next, the locked-state setting unit 780 in the RFID tag 70 sets the lock information held in the locked-state holding unit 770 to a "locked state" (S2010). In other words, the locked-state setting unit 780 locks the service key storage region 730. Then, the locked-state setting unit 780 transmits a locking completion notification to the third party application 520 (S2011).

Next, the processing for unlocking the locked state of the service key storage region 730 is described.

Figure 15:
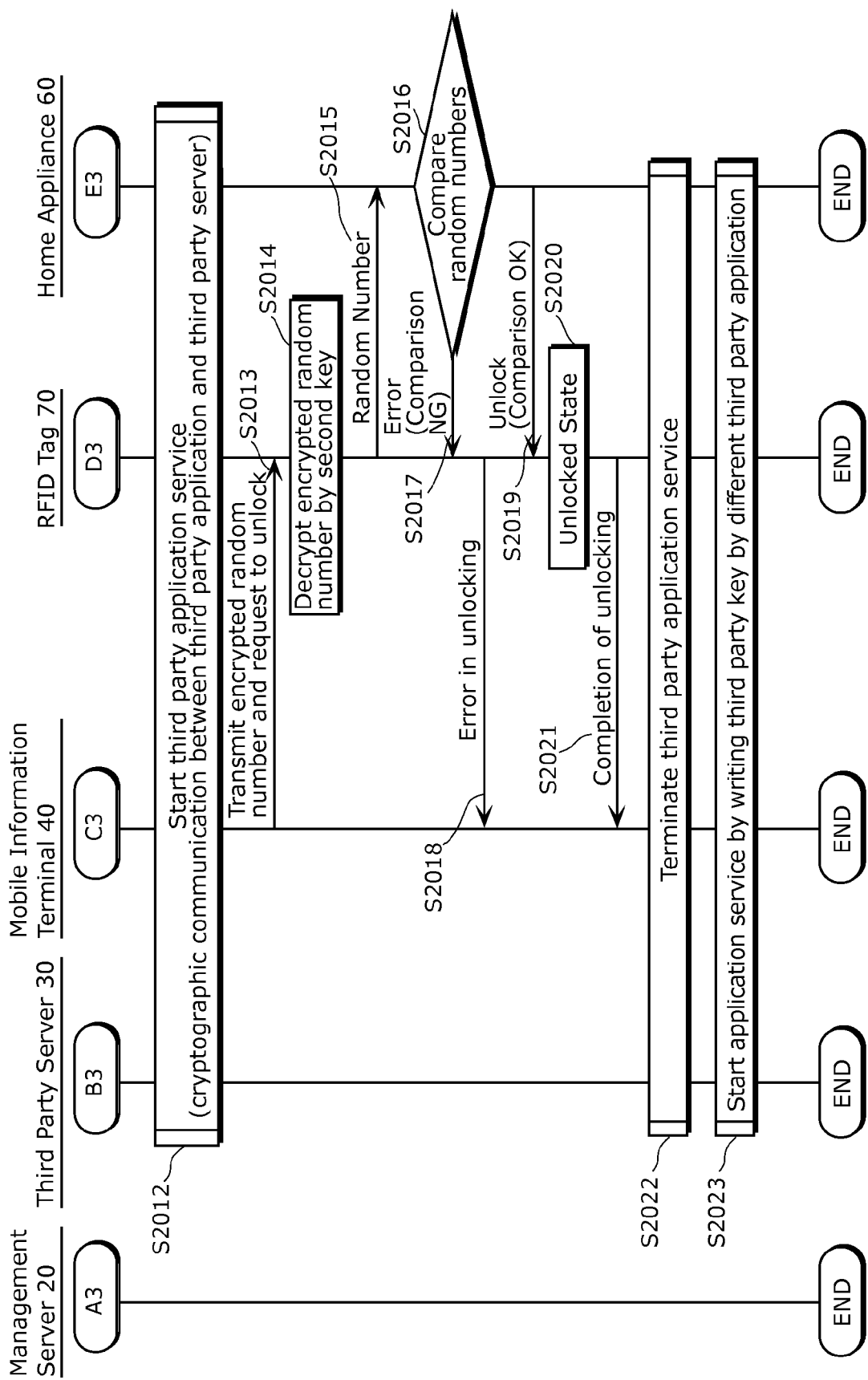
FIG. 15 is a sequence diagram of processing for unlocking the service key storage region according to Embodiment 2.

FIG. 15 is a sequence of unlocking the service key storage region 730.

First, the third party application 520 performs processing for providing services (S2012). For example, the third party application 520 gathers pieces of home appliance information via the RFID tag 70, and transmits the gathered pieces of home appliance information to the third party server 30. Furthermore, the third party application 520 transmits a command, which has been received from the third party server 30, to the home appliance 60 via the RFID tag 70. It should be noted that the communication between the third party server and the RFID tag 70 at Step S2012 is end-to-end cryptographic communication as described in Embodiment 1.

Next, when the cryptographic communication becomes unnecessary, the third party application 520 transmits, to the RFID tag 70, a request for unlocking (unlock request), together with the encrypted random number received at Step S2004 (S2013). The unlock request is a request for an unlocked state. In other words, the unlock request is information for requesting to unlock the service key storage region 730.

Next, the cryptographic processing unit 750 in the RFID tag 70 decrypts the encrypted random number by using the second key 732 stored in the service key storage region 730 (S2014). The cryptographic processing unit 750 transmits the decrypted random number to the home appliance 60 (S2015).

Next, the home appliance 60 compares the random number received at Step S2015 to the random number stored in the home appliance information holding unit 660 at Step S2008 (S2016). If it is determined at Step 2016 that the random numbers are not the same, then the home appliance 60 notifies the error to the RFID tag 70 (S2017). Then, the RFID tag 70 notifies an unlocking error to the third party application 520 (S2018).

On the other hand, if it is determined at Step 2016 that the random numbers are the same, then the home appliance 60 transmits a request for unlocking to the RFID tag 70 (S2019).

Next, the locked-state setting unit 780 in the RFID tag 70 sets the lock information held in the locked-state holding unit 770 to an "unlocked state" (S2020). In other words, the locked-state setting unit 780 unlocks the service key storage region 730. Then, the locked-state setting unit 780 transmits an unlocking completion notification to the third party application 520 (S2021).

Next, in receiving the unlocking completion notification, the third party application 520 terminates service processing (application) currently being performed (S2022).

Next, if the lock information held in the locked-state holding unit 770 is set as an "unlocked state", then a third party application 530 different from the above third party application 520 writes a key of the different third party application 530 into the service key storage region 730, and thereby performs end-to-end cryptographic communication (S2023).

As described above, the unlocking of the service key storage region 730 is performed only by the third application that has locked the service key storage region 730. It is therefore possible to prevent that, while an authorized third party application is offering services, a different unauthorized application maliciously rewrites a key and hampers the service.

This is the end of the description according to Embodiment 2.

It should be noted that it has been described in Embodiment 2 that the third party application 520 generates a random number at Step S2001, but the third party application 520 may use verification information other than a random number. For example, the third party application 520 may generate a digital signature or the like. In this case, the verification information may be any verification information that is not known by any applications other than the third party application 520.

It should also be noted that it has been described in Embodiment that the third party server 30 encrypts a random number, but it is also possible that the mobile information terminal 40 encrypts a random number.

Although the present invention has been described according to the above embodiments, the present invention is, of course, not limited to the above embodiments.

It has been described in the above embodiments that the RFID tag service system corresponds to a key management system. The key management system may be applied to any other service systems. It is possible that the key management system does not include the management server 20 and the third party server 30.

Although it has been described in the above embodiments that the home appliance 60 and the mobile information terminal 40 communicate to each other by using the RFID tag communication, it is also possible to use any other communication methods. For example, the home appliance 60 and the mobile information terminal 40 may communicate to each other via an IP network or a mobile telephone network.

In other words, the home appliance 60 may be any communication devices capable of communicating with the mobile information terminal 40. Likewise, the mobile information terminal 40 may be any communication devices capable of communicating with the home appliance 60, the management server 20, and the third party server 30.

Moreover, the following is also included in the present invention.

(1) Each of the above devices according to the embodiments is a computer system including a microprocessor, a Read Only Memory (ROM), a Random Access Memory (RAM), a hard disk unit, a display unit, a keyboard, a mouse, and the like The RAM or the hard disk unit holds a computer program. The microprocessor operates according to the computer program to cause each of the devices to perform its function. Here, the computer program consists of combinations of instruction codes for issuing instructions to the computer to execute predetermined functions.

(2) It should be noted that a part or all of the structural elements included in each of the devices according to the embodiments may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The RAM holds a computer program. The microprocessor operates according to the computer program to cause the system LSI to perform its functions.

It should also be noted that each of the structural elements included in the devices according to the above embodiments may be implemented into a single chip, or a part or all of the structural elements may be implemented into a single chip.

Here, the integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

(3) It should also be noted that a part or all of the structural elements included in each of the devices according to the above embodiments may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor executes the computer program to cause the IC card or the module to perform its functions. The IC card or the module may have tamper resistance.

(4) It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

(5) It should also be noted that the above-described embodiments and their variations may be combined.

Although the key management systems according to one or more aspects have been described according to the embodiments, the present invention is not limited to the embodiments. Those skilled in the art will be readily appreciated that various modifications of the exemplary embodiments and combinations of the structural elements of the different embodiments are possible without materially departing from the novel teachings and advantages of the present invention. Accordingly, all such modifications and combinations are intended to be included within the scope of the present invention.

INDUSTRIAL APPLICABILITY

The present invention is applicable to RFID tag service systems that provide services via RFID tags.

REFERENCE SIGNS LIST

10 RFID tag service system
20 management server
21, 721 master key
23, 33 home appliance information management database
24 user ID
25, 662 device ID
26, 661 home appliance information
30 third party server
31, 731 first key
32, 732 second key
40 mobile information terminal
50 application
60 home appliance
70 RFID tag
410 network control unit
420 RFID tag reader/writer control unit
510 management application
520, 530 third party application
620 tag communication unit
630 home appliance command receiving unit
640 home appliance command processing unit
650 home appliance information control unit
660 home appliance information holding unit
670 key rewriting control unit
680 key information storage unit
710 non-contact communication unit
720 master key storage region
730 service key storage region
740 home appliance communication unit
750 cryptographic processing unit
760 key writing processing unit
770 locked-state holding unit
780 locked-state setting unit

The invention claimed is:

1. A key management system for writing, into a home appliance, a second key to be used in cryptographic communication between the home appliance and a second server, by using a mobile information terminal that communicates with (a) a first server managing a master key and (b) the second server managing a first key and the second key, the key management system comprising:
the mobile information terminal; and the home appliance, wherein the home appliance includes:
a computer processor; and
a non-transitory computer-readable medium having stored thereon executable instructions that, when executed by the computer processor, cause the home appliance to function as:
a communication unit configured to communicate with the mobile information terminal;
a master key storage region in which the master key is previously stored;
a service key storage region in which the first key and the second key are to be stored;
a key writing processing unit configured to write, into the service key storage region, one of (a) the first key encrypted by the master key and (b) the second key encrypted by the master key, only when the communication unit receives the one of (a) the first key and (b) the second key; and
a cryptographic processing unit configured to perform cryptographic processing using one of (i) the master key stored in the master key storage region and (ii) the one of the first key and the second key which is stored in the service key storage region,
when the mobile information terminal receives, from one of the first server and the second server, the first key encrypted by the master key managed in the first server, the mobile information terminal transmits (a) the first key encrypted by the master key and (b) a request for writing of the first key,
when the communication unit receives the first key encrypted by the master key and the request for writing of the first key from the mobile information terminal, the cryptographic processing unit is configured to decrypt the first key by the master key stored in the master key storage region, and the key writing processing unit is configured to write the decrypted first key to the service key storage region,
when the mobile information terminal receives, from the second server, the second key encrypted by the first key managed in the second server, the mobile information terminal transmits, to the communication unit, the second key encrypted by the first key,
when the communication unit receives, from the mobile information terminal, the second key encrypted by the first key, the cryptographic processing unit is configured to decrypt the second key by the first key stored in the service key storage region, the home appliance holds the decrypted second key, the mobile information terminal transmits, to the communication unit, a request for reading of the second key held in the home appliance, when the communication unit receives, from the mobile information terminal, the request for reading of the second key, the cryptographic processing unit is configured to encrypt, by the master key stored in the master key storage region, the second key held in the home appliance, and the second key encrypted by the master key is transmitted to the mobile information terminal, the mobile information terminal receives, from the communication unit, the second key encrypted by the master key, and transmits, to the communication unit, the second key and a request for writing of the second key, and when the communication unit receives, from the mobile information terminal, the second key encrypted by the master key and the request for writing of the second key, the cryptographic processing unit is configured to decrypt the second key by the master key stored in the master key storage region, and the key writing processing unit is configured to write the decrypted second key to the service key storage region.

2. The key management system according to claim 1, wherein, in the mobile information terminal, a plurality of application programs are installed, each of the application programs corresponding to a corresponding one of a plurality of second servers including the second server, and each of the application programs being used in cryptographic communication between the home appliance and the corresponding one of the second servers, the mobile information terminal receives a plurality of encrypted second keys including the second key encrypted by the master key from the communication unit and holds the second keys, each of the second keys corresponding to a corresponding one of the application programs, when switching is performed among the application programs, the mobile information terminal transmits, to the communication unit, (a) a target encrypted second key corresponding to an application program selected in the switching from the application programs, and (b) a request for writing of the target encrypted second key, and when the communication unit receives, from the mobile information terminal, the target encrypted second key and the request for writing, the cryptographic processing unit is configured to decrypt the target encrypted second key by the master key stored in the master key storage region, and the key writing processing unit is configured to write the decrypted second key to the service key storage region.

3. The key management system according to claim 1, wherein the home appliance holds home appliance information regarding the home appliance, when the communication unit receives the home appliance information from the home appliance, the cryptographic processing unit is configured to encrypt the home appliance information by the master key stored in the master key storage region and transmits the home appliance information encrypted by the master key to the mobile information terminal, and the mobile information terminal receives the home appliance information encrypted by the master key from the communication unit, and transmits the home appliance information encrypted by the master key to the first server.

4. The key management system according to claim 1, wherein the home appliance holds home appliance information regarding the home appliance, when the communication unit receives the home appliance information from the home appliance, the cryptographic processing unit is configured to encrypt the home appliance information by the second key stored in the service key storage region, and the home appliance information encrypted by the second key is transmitted to the mobile information terminal, and the mobile information terminal receives the home appliance information encrypted by the second key from the communication unit, and transmits the home appliance information encrypted by the second key to the second server.

5. The key management system according to claim 1, wherein the executable instructions, when executed by the computer processor, cause the home appliance to further function as:

a locked-state holding unit configured to hold lock information, the lock information being used to (i) lock the service key storage region to prohibit a key from being re-written or (ii) unlock the service key storage region to allow a key to be re-written; and a locked-state setting unit configured to update the lock information held in the locked-state holding unit to lock or unlock the service key storage region, the mobile information terminal transmits, to the communication unit, first verification information and a request for rewriting of a key stored in the service key storage region, the home appliance holds the first verification information received by the communication unit, after the rewriting is completed in response to the request from the mobile information terminal, the locked-state setting unit is configured to lock the service key storage region, the mobile information terminal transmits, to the communication unit, second verification information and a request for unlocking of the service key storage region, only when the first verification information is identical to the second verification information, the home appliance transmits the request for unlocking to the locked-state setting unit, and after receiving the request for unlocking from the home appliance, the locked-state setting unit is configured to unlock the service key storage region.

6. The key management system according to claim 1, wherein the communication unit is a Radio Frequency IDentification (RFID) tag that performs near field communication with the mobile information terminal.

7. A communication device, comprising:

a computer processor; and a non-transitory computer-readable medium having stored thereon executable instructions that, when executed by the computer processor, cause the communication device to function as:

a communication unit configured to communicate with a second communication device that communicates with (a) a first server managing a master key and (b) a second server managing a first key and a second key;

a master key storage region in which the master key is previously stored;

a service key storage region in which the first key and the second key are to be stored;

a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, wherein, when the communication unit receives, from the second communication device, (a) the first key encrypted in the first server by the master key managed in the first server and (b) a request for writing of the first key, the cryptographic processing unit is configured to decrypt the first key by the master key stored in the master key storage region, and the key writing processing unit is configured to write the decrypted first key to the service key storage region, when the communication unit receives, from the second communication device, the second key encrypted in the second server by the first key managed in the second server, the cryptographic processing unit is configured to decrypt the second key by the first key stored in the service key storage region, and the communication device holds the decrypted second key, when the communication unit receives, from the second communication device, a request for reading of the second key held in the communication device, the cryptographic processing unit is configured to encrypt, by the master key stored in the master key storage region, the second key held in the communication device, and the encrypted second key is transmitted to the second communication device, and when the communication unit receives, from the second communication device, (a) the second key that is encrypted by the master key and transmitted to the second communication device and (b) a request for writing of the second key, the cryptographic processing unit is configured to decrypt the second key by the master key stored in the master key storage region, and the key writing processing unit is configured to write the decrypted second key to the service key storage region.

8. The communication device according to claim 7, wherein the executable instructions, when executed by the computer processor, cause the communication device to further function as:

a locked-state holding unit configured to hold lock information, the lock information being used to (i) lock the service key storage region to prohibit a key from being re-written or (ii) unlock the service key storage region to allow a key to be re-written; and a locked-state setting unit configured to update the lock information held in the locked-state holding unit to lock or unlock the service key storage region, wherein when the communication unit receives, from the second communication device, (a) a request for re-writing of a key stored in the service key storage region and (b) first verification information, the communication device holds the first verification information received by the communication unit, after the re-writing is completed in response to the request for the re-writing from the second communication device, the locked-state setting unit is configured to lock the service key storage region, when the communication unit receives, from the second communication device, (a) a request for unlocking of the service key storage region and (b) second verification information, only when the first verification information is identical to the second verification information, the communication device transmits the request for unlocking to the locked-state setting unit, and after receiving the request for unlocking from the communication device, the locked-state setting unit is configured to unlock the service key storage region.

9. The communication device according to claim 7, wherein the communication device is a home appliance, and the second communication device is a mobile information terminal.

10. The communication device according to claim 7, wherein the communication unit is a Radio Frequency IDentification (RFID) tag that performs near field communication with the second communication device.

11. A key management method of writing, into a home appliance, a second key to be used in cryptographic communication between the home appliance and a second server, by using a mobile information terminal that communicates with (a) a first server managing a master key and (b) the second server managing a first key and the second key, the home appliance including:

a computer processor; and a non-transitory computer-readable medium having stored thereon executable instructions that, when executed by the computer processor, cause the home appliance to function as:

a communication unit configured to communicate with the mobile information terminal;

a master key storage region in which the master key is previously stored;

a service key storage region in which the first key and the second key are to be stored;

a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, the key management method comprising:

when the mobile information terminal receives, from one of the first server and the second server, the first key encrypted by the master key managed in the first server, the mobile information terminal transmits (a) the first key encrypted by the master key and (b) a request for writing of the first key, when the communication unit receives the first key encrypted by the master key and the request for writing of the first key from the mobile information terminal, the cryptographic processing unit is configured to decrypt the first key by the master key stored in the master key storage region, and the key writing processing unit is configured to write the decrypted first key to the service key storage region, when the mobile information terminal receives, from the second server, the second key encrypted by the first key managed in the second server, the mobile information terminal transmits, to the communication unit, the second key encrypted by the first key, when the communication unit receives, from the mobile information terminal, the second key encrypted by the first key, the cryptographic processing unit is configured to decrypt the second key by the first key stored in the service key storage region, the home appliance holds the decrypted second key, the mobile information terminal transmits, to the communication unit, a request for reading of the second key held in the home appliance, when the communication unit receives, from the mobile information terminal, the request for reading of the second key, the cryptographic processing unit is configured to encrypt, by the master key stored in the master key storage region, the second key held in the home appliance, and the second key encrypted by the master key is transmitted to the mobile information terminal, the mobile information terminal receives, from the communication unit, the second key encrypted by the master key, and transmits, to the communication unit, the second key and a request for writing of the second key, and when the communication unit receives, from the mobile information terminal, the second key encrypted by the master key and the request for writing of the second key, the cryptographic processing unit is configured to decrypt the second key by the master key stored in the master key storage region, and the key writing processing unit is configured to write the decrypted second key to the service key storage region.

12. A key management method performed by a communication device, the communication device including:

a computer processor; and a non-transitory computer-readable medium having stored thereon executable instructions that, when executed by the computer processor, cause the communication device to function as:

a communication unit configured to communicate with a second communication device that communicates with (a) a first server managing a master key and (b) a second server managing a first key and a second key;

a master key storage region in which the master key is previously stored;

a service key storage region in which the first key and the second key are to be stored;

a key writing processing unit configured to write, into the service key storage region, one of (a) the first key encrypted by the master key and (b) the second key encrypted by the master key, only when the communication unit receives the one of (a) the first key and (b) the second key; and a cryptographic processing unit configured to perform cryptographic processing using one of (i) the master key stored in the master key storage region and (ii) the one of the first key and the second key which is stored in the service key storage region, the key management method comprising:

wherein, when the communication unit receives, from the second communication device, (a) the first key encrypted in the first server by the master key managed in the first server and (b) a request for writing of the first key, (i) decrypting, by the cryptographic processing unit, the first key by the master key stored in the master key storage region, and (ii) writing, by the key writing processing unit, the decrypted first key to the service key storage region, when the communication unit receives, from the second communication device, the second key encrypted in the second server by the first key managed in the second server, (i) decrypting, by the cryptographic processing unit, the second key by the first key stored in the service key storage region, and (ii) holding the decrypted second key in the communication device, when the communication unit receives, from the second communication device, a request for reading of the second key held in the communication device, (i) encrypting, by the cryptographic processing unit, the second key held in the communication device by the master key stored in the master key storage region, and (ii) transmitting the encrypted second key to the second communication device, and when the communication unit receives, from the second communication device, (a) the second key that is encrypted by the master key and transmitted to the second communication device and (b) a request for writing of the second key, (i) decrypting, by the cryptographic processing unit, the second key by the master key stored in the master key storage region, and (ii) writing, by the key writing processing unit, the decrypted second key to the service key storage region.

13. A non-transitory recording medium on which a program is recorded, the program causing a computer to execute the key management method according to claim 12.

* * * * *